US010602457B2

(12) United States Patent
Fujita et al.

(10) Patent No.: US 10,602,457 B2
(45) Date of Patent: Mar. 24, 2020

(54) WIRELESS COMMUNICATION APPARATUS AND WIRELESS COMMUNICATION METHOD

(71) Applicant: SONY CORPORATION, Tokyo (JP)

(72) Inventors: Chihiro Fujita, Kanagawa (JP);
Kazuyuki Sakoda, Chiba (JP);
Nobuhiko Watanabe, Kanagawa (JP);
Yoshihiko Ikenaga, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/192,348

(22) Filed: Nov. 15, 2018

(65) Prior Publication Data

US 2019/0104483 A1   Apr. 4, 2019

Related U.S. Application Data

(63) Continuation of application No. 14/907,814, filed as application No. PCT/JP2014/064470 on May 30, 2014, now Pat. No. 10,154,464.

(30) Foreign Application Priority Data

Jul. 29, 2013   (JP) ................................ 2013-156361

(51) Int. Cl.
*H04W 16/04*   (2009.01)
*H04W 52/24*   (2009.01)
(Continued)

(52) U.S. Cl.
CPC ......... *H04W 52/248* (2013.01); *H04W 52/04* (2013.01); *H04W 52/242* (2013.01);
(Continued)

(58) Field of Classification Search
CPC . H04W 52/383; H04W 72/082; H04B 10/564
(Continued)

(56) References Cited

U.S. PATENT DOCUMENTS

| 7,787,899 B1 | 8/2010 | Talley et al. |
| 2005/0124370 A1 | 6/2005 | Nanda |

(Continued)

FOREIGN PATENT DOCUMENTS

| CA | 2547325 A1 | 7/2005 |
| CN | 101998609 A | 3/2011 |

(Continued)

OTHER PUBLICATIONS

Extended European Search Report of EP Patent Application No. 14831188.9, dated Dec. 8, 2017, 08 pages.

(Continued)

*Primary Examiner* — Tu X Nguyen
(74) *Attorney, Agent, or Firm* — Chip Law Group

(57) ABSTRACT

There is provided a wireless communication apparatus and wireless communication method, which can perform information transfer, while suppressing interference to other terminal stations, and preventing a reduction of a transmission opportunity of other terminal stations. By causing the transmission power to be reduced, at the time when a traffic amount to be transmitted and received by itself increases, a terminal station which performs wireless access based on CSMA on a mesh network can suppress interference to other surrounding terminal stations, and can prevent a reduction of a transmission opportunity of other terminal stations. By measuring the number of and sizes of packets to be transmitted and received, it is possible for a terminal station to comprehend the traffic amount to be transmitted and received by itself, and perform a control of the transmission power by this.

19 Claims, 19 Drawing Sheets

(51) Int. Cl.
*H04W 74/08* (2009.01)
*H04W 52/04* (2009.01)
*H04W 84/18* (2009.01)
*H04W 52/14* (2009.01)
*H04W 52/36* (2009.01)

(52) U.S. Cl.
CPC ....... *H04W 52/243* (2013.01); *H04W 52/245* (2013.01); *H04W 74/0808* (2013.01); *H04W 52/146* (2013.01); *H04W 52/367* (2013.01); *H04W 84/18* (2013.01)

(58) Field of Classification Search
USPC .......................................... 455/69, 522, 313
See application file for complete search history.

(56) References Cited

U.S. PATENT DOCUMENTS

| | | | |
|---|---|---|---|
| 2007/0242621 A1 | 10/2007 | Nandagopalan et al. | |
| 2008/0144493 A1 | 6/2008 | Yeh | |
| 2008/0316052 A1 | 12/2008 | Ruffini | |
| 2011/0195731 A1 | 8/2011 | Jang et al. | |
| 2011/0243010 A1 | 10/2011 | Geirhofer et al. | |
| 2012/0120806 A1 | 5/2012 | Jeon et al. | |
| 2012/0224484 A1 | 9/2012 | Babiarz et al. | |
| 2014/0314003 A1 | 10/2014 | Zhou et al. | |
| 2018/0014311 A1* | 1/2018 | Bhargava | H04K 3/222 |

FOREIGN PATENT DOCUMENTS

| | | |
|---|---|---|
| EP | 1895714 A1 | 3/2008 |
| EP | 2026474 A2 | 2/2009 |
| JP | 2005-033557 A | 2/2005 |
| JP | 2005-253047 A | 9/2005 |
| JP | 2007-513572 A | 5/2007 |
| JP | 2008-507884 A | 3/2008 |
| JP | 2012-186758 A | 9/2012 |
| KR | 10-2006-0120702 A | 11/2006 |
| KR | 10-2007-0042149 A | 4/2007 |
| WO | 2005/062559 A1 | 7/2005 |
| WO | 2006/011123 A1 | 2/2006 |

OTHER PUBLICATIONS

Notice of Allowance and Fees Due for U.S. Appl. No. 14/907,814, dated Aug. 13, 2018, 07 pages.
Non-Final Rejection for U.S. Appl. No. 14/907,814, dated Apr. 12, 2018, 09 pages.
Notice of Allowance and Fees Due for U.S. Appl. No. 14/907,814, dated Sep. 28, 2017, 07 pages.
Non-Final Rejection for U.S. Appl. No. 14/907,814, dated Jun. 7, 2017, 09 pages.
Final Rejection for U.S. Appl. No. 14/907,814, dated Nov. 10, 2016, 10 pages.
Non-Final Rejection for U.S. Appl. No. 14/907,814, dated Jul. 21, 2016, 08 pages.
International Search Report and Written Opinion of PCT Application No. PCT/JP2014/064470, dated Sep. 2, 2014, 06 pages of English Translation and 06 pages of ISRWO.
International Preliminary Report on Patentability of PCT Application No. PCT/JP2014/064470, dated Feb. 11, 2016, 6 pages of English Translation and 04 pages of IPRP.
Office Action for EP Patent Application No. 14831188.9, dated Dec. 6, 2018, 07 pages of Office Action.

* cited by examiner

WIRELESS COMMUNICATION APPARATUS AND WIRELESS COMMUNICATION METHOD

CROSS REFERENCE TO RELATED APPLICATIONS

The present application is a continuation application of U.S. patent application Ser. No. 14/907,814, filed Jan. 26, 2016, which is a National Stage Entry of PCT/JP2014/064470, filed May 30, 2014, which claims the benefit of priority from Japanese Priority Patent Application JP 2013-156361 filed Jul. 29, 2013 which are hereby incorporated by reference in their entirety for all purposes.

TECHNICAL FIELD

The technology disclosed in the present disclosure is related to a wireless communication apparatus and wireless communication method which mainly controls access to a media in accordance with an occupancy state of the media, and for example, is related to a wireless communication apparatus and wireless communication method which performs information transfer under a communication environment in which a plurality of terminal stations are present by a same channel such as a mesh network.

BACKGROUND ART

In networks using wireless technology, a configuration method is widely known in which each terminal performs information transfer by a subordinate of a control station called an "access point" or the like. Each terminal station performs wireless communication, while synchronizing via the access point. For example, a terminal station reserves a necessary band for information transfer, and uses a channel so that a collision with information transfer of other terminal stations is not produced. However, in such a configuration method of a network, it may be necessary to perform wireless communication via the access point, even at the time when performing asynchronous communication among terminals, and there will be the problem of the utilization efficiency of the channel being reduced by half.

In contrast to this, "Ad-hoc communication", in which terminal stations perform direct and asynchronous wireless communication not via an access point, has been devised as another configuration method of a wireless network. For example, in an IEEE802.11 type wireless Local Area Network (LAN) system, in addition to an infrastructure mode in which an access point intervenes, an Ad-hoc mode is prepared in which each terminal station is operated by Peer-to-Peer with autonomous distribution, without distributing an access point.

In an Ad-hoc network, there is no means for synchronizing between terminal stations, such as an access point. Accordingly, it may be necessary to avoid competition, at the time where a plurality of terminal stations use a same channel. Carrier Sense Multiple Access (CSMA) is known as a representative access system which avoids competition. In CSMA, a terminal station with transmission information avoids collisions by a procedure, which confirms an occupancy state of a media before transmission, and starts transmission in the case where the media is clear.

Further, in CSMA, there is the problem of hidden terminals. Here, a hidden terminal is a terminal station in a state where mutual wireless signals do not arrive. Since a carrier of a hidden terminal is not able to be detected, a collision with a hidden terminal is not able to be avoided by only CSMA.

RTS/CTS has been devised as a method which avoids collisions with hidden terminals. A communication station of a transmission source transmits a transmission request packet Request To Send (RTS), and starts data transmission by replying to a confirmation notification packet Clear To Send (CTS) received from a communication station of a data transmission destination. Also, since a hidden terminal can receive at least one of a RTS and a CTS, a collision is avoided, by setting a transmission stop period of the station itself only for the period in which it is assumed that data transfer is performed based on RTS/CTS.

However, in an access system based on CSMA, there will be the problem of a transmittable opportunity being reduced in accordance with the number of terminal stations attempting to perform information transmission on a same channel, even if a collision such as described above can be avoided. In the case where a certain terminal station does not want to perform communication with a terminal station, where a path loss with this terminal present at an extremely adjacent location is remarkably small compared to a path loss with other stations, transmission for collision avoidance will not be permitted, when receiving a signal of another terminal station (for example, refer to Patent Literature 1). That is, when a traffic amount increases on a channel, the interference amount to an adjacent terminal station will increase, and the band used by the adjacent terminal station will be limited.

SUMMARY OF INVENTION

Technical Problem

The inventors of the technology disclosed in the present disclosure have provided an excellent wireless communication apparatus and wireless communication method, which can suitably perform information transfer, by a system which controls access to a media in accordance with an occupancy state of the media.

The inventors of the technology disclosed in the present disclosure have provided an excellent wireless communication apparatus and wireless communication method, which can suitably perform information transfer, while suppressing interference to other terminal stations, and preventing a reduction of a transmission opportunity of other terminal stations.

Solution to Problem

The present application has been made in view of the aforementioned problems. According to a technology described in claim 1, there is provided a wireless communication apparatus including: a transmission unit which transmits a wireless signal; a reception unit which receives a wireless signal; an influence degree estimation unit which estimates an influence degree given to a surrounding terminal station by transmission data from the transmission unit; and a transmission power control unit which controls a transmission power of the transmission unit based on the influence degree.

According to a technology described in claim 2, the transmission power control unit may control a transmission power of the transmission unit based on the influence degree and a minimum transmission power capable of retaining a present data transfer.

According to a technology described in claim 3, a minimum transmission power capable of retaining a present data transfer may be calculated based on a data transfer speed necessary for presently transferred data, path loss information obtained from an RSSI or MCS, and a QoS of data.

According to a technology described in claim 4, at a time when the influence degree exceeds a prescribed value, the transmission power control unit may change a transmission power of the transmission unit to the minimum transmission power. According to a technology described in claim 5, the transmission power control unit may change a transmission power to a transmission power corresponding to a relationship between the influence degree and the minimum transmission power.

According to a technology described in claim 6, a signal detection capability in the reception unit may be controlled in accordance with a change in a transmission power of the transmission unit.

According to a technology described in claim 7, the wireless communication apparatus may perform a communication operation by a mesh network, and a metric of a path may be recalculated in accordance with a change in a transmission power of the transmission unit.

According to a technology described in claim 8, the influence degree estimation unit may measure a traffic amount to be handled by the transmission unit and the reception unit as the influence degree. According to a technology described in claim 9, the influence degree estimation unit may measure a traffic amount by counting the number of packets or a size of packet to be transmitted and received by the transmission unit and the reception unit.

According to a technology described in claim 10, the influence degree estimation unit may measure the number of links as the influence degree.

According to a technology described in claim 11, the influence degree estimation unit may additionally estimate an influence degree given to the wireless communication apparatus itself by transmission data from the transmission unit, and the transmission power control unit may control a transmission power of the transmission unit based on the influence degree.

According to a technology described in claim 12, the influence degree estimation unit may estimate a stability degree of a path of the wireless communication apparatus, and the transmission power control unit may control a transmission power of the transmission unit based on the stability degree of the path.

According to a technology described in claim 13, the influence degree estimation unit may estimate the stability degree of the path based on a variation amount of a path metric, the number of links, and a traffic amount, in at least one fixed time in the past.

According to a technology described in claim 14, the influence degree estimation unit may estimate whether or not there is a condition where an addition of a new link is to be limited by the wireless communication apparatus, and the transmission power control unit may control a transmission power in accordance with the condition. According to a technology described in claim 15, the influence degree estimation unit may estimate whether or not there is a condition where an addition of a new link is to be limited based on at least one of a present traffic and power supply state.

According to a technology described in claim 16, the influence degree estimation unit may estimate a link condition of a peer with a certain terminal station, and the transmission power control unit may control a transmission power in accordance with the link condition.

According to a technology described in claim 17, the influence degree estimation unit may estimate the link condition based on at least one of an MCS used for transmission to the terminal station, a reception RSSI from the terminal station, and a report value of an RSSI from the terminal station.

According to a technology described in claim 18, another terminal station may be notified of information of a transmission power changed by the transmission power control unit.

According to a technology described in claim 19, a path loss may be back calculated from an MCS used for a data packet transmitted from a terminal station of a communication partner, and a packet error rate of a packet transmitted from the terminal station, and a transmission power of the communication partner is estimated based on the path loss and a reception RSSI.

According to a technology described in claim 20, there is provided a wireless communication method including: an influence degree estimation step which estimates an influence degree given to a surrounding terminal station by transmission data; and a transmission power control step which controls a transmission power at a time of data transmission based on the influence degree.

Advantageous Effects of Invention

According to the technology disclosed in the present disclosure, there is provided an excellent wireless communication apparatus and wireless communication method, which can suitably perform information transfer, while suppressing interference to other terminal stations, and preventing a reduction of a transmission opportunity of other terminal stations.

In addition, the effects described in the present specification are merely illustrative and demonstrative, and not limitative. In other words, the technology according to the present disclosure can exhibit other effects that are evident to those skilled in the art along with or instead of the effects based on the present specification.

The object, features, and advantages of the present disclosure will be made clear later by a more detailed explanation that is based on the embodiments of the present disclosure and the appended drawings.

DESCRIPTION OF EMBODIMENTS

Figure 1:
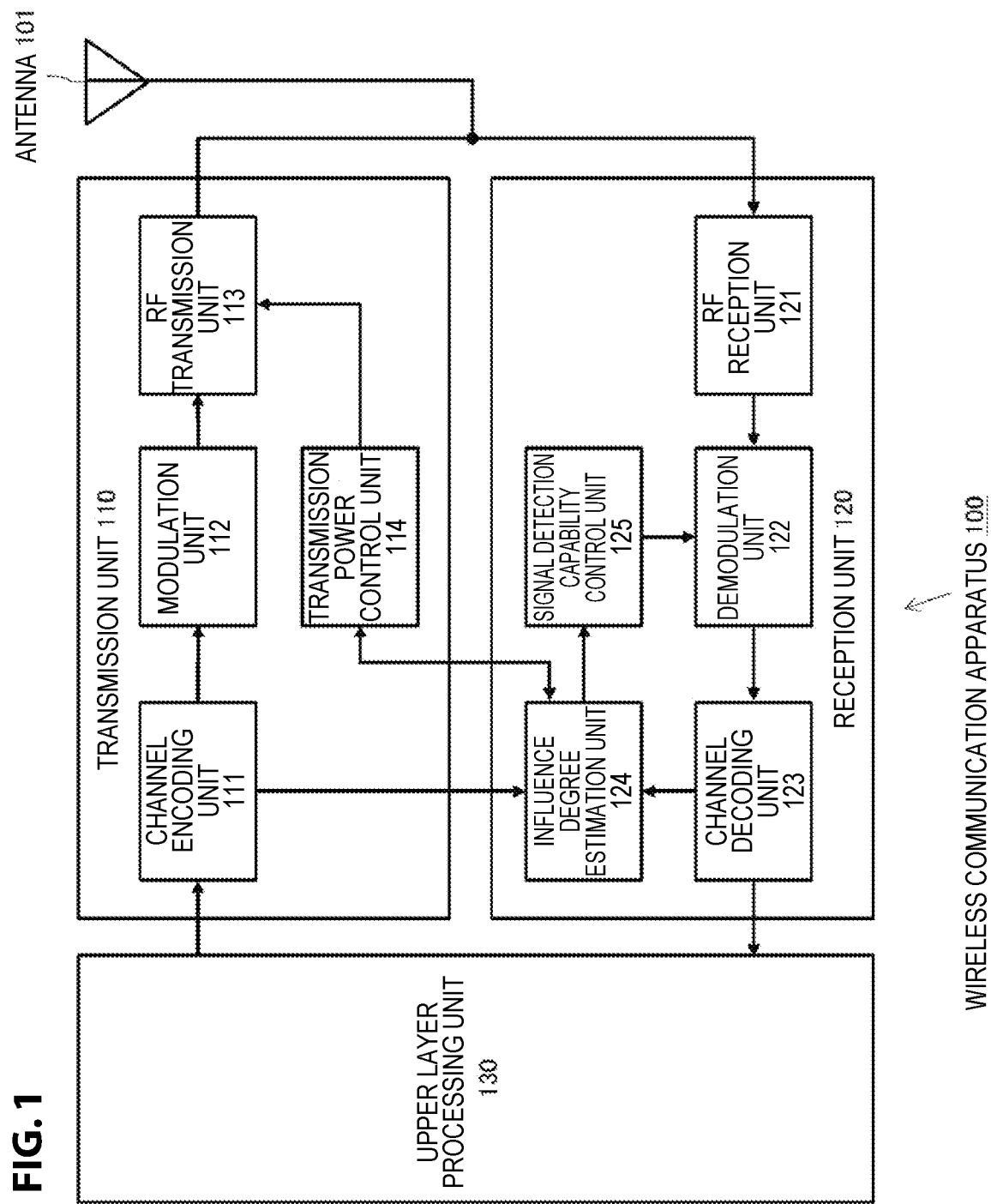
FIG. 1 is a figure which shows a configuration of a wireless communication apparatus 100 applying the technology disclosed in the present disclosure.

Hereinafter, embodiments of the technology disclosed in the present disclosure will be described in detail while referring to the figures.

The technology disclosed in the present disclosure can be applied to a wireless network to which an access system is applied based on CSMA, adopted by IEEE802.11 or the like. For example, the technology disclosed in the present disclosure can be applied to a mesh network such as prescribed by IEEE802.11s. In this type of wireless network, it is assumed that a plurality terminal stations are adjacently present which use a same channel. In such a case, problems such as shown in the following (1) to (4) will be a concern.

Problem (1) Reduction of a Transmission Opportunity in the Case where a Traffic Amount Increases In an access system based on CSMA, when a traffic amount increases on a same channel, a transmittable opportunity reduces. In the case where a certain terminal station does not want to perform communication with a terminal station, where a path loss with this terminal present at an extremely adjacent location is remarkably small compared to a path loss with other stations, transmission for collision avoidance will not be permitted, when receiving a signal of another terminal station. That is, when a traffic amount increases on a channel, the interference amount to an adjacent terminal station will increase, and the band used by the adjacent terminal station will be limited.

Problem (2) Enlargement of Unnecessary Interference

In an access system based on CSMA, when a certain terminal station performs transmission and reception, this data becomes interference for adjacent terminal stations other than the reception station which use a same channel. When performing data transmission with a transmission power higher than necessary, by a link with a good transfer environment, a transmission opportunity of other terminal stations becomes wastefully reduced.

Problem (3) Occurrence of a Relay Opportunity by a Terminal Station with a Low Power Supply Capacity In a mesh network such as prescribed by IEEE802.11s, a mutual connection is performed, between transmission and reception terminal stations at which electric waves do not directly reach, by multi-hop communication in which an adjacent terminal station performs a relay. In the case where a plurality of paths exist, a metric is calculated for each path, and the path having the best metric is selected. A metric is a value which shows the closeness of a path, and information is generally used which shows the quality of a link, such as the number of hops or transfer delay, a strength of a wireless link, a bandwidth, or a channel occupation time (for example, refer to Patent Literature 2). However, path selection is hardly ever performed in consideration of the circumstances of a relaying terminal station.

There are terminal stations in which stable power is supplied from an AC power supply, and there are terminal stations which operate by batteries. When performing a relay of another terminal station, in a state where a power supply capacity is low, it can become difficult for the latter to secure a necessary power supply for data transfer of itself. Further, cases are possible where a terminal station, which performs a large amount of data transfer with only an adjacent terminal station, is temporarily not able to perform a relay. The circumstances for each of such terminal stations is not considered, in path selection based on a metric calculation. It can also be considered that a terminal station, for which a relay is not wanted to be performed, is cut from the mesh network, and a separate link is set by Wi-Fi Direct or the like. However, in the case where the wireless band is tight, such as having a large number of terminal stations adjacently present which use a same channel, such a separate link will become interference of the adjacent terminal stations, and so a fundamental solution is not reached.

Problem (4) Difficulty of an Estimation of a Path Loss in the Case where Performing Transmission Power Control A terminal station measures a reception power (RSSI: Received Signal Strength Indication) of a packet received by a terminal station of a communication partner, and estimates a path loss by taking a difference of transmission powers. Also, an appropriate Modulation and Coding Scheme (MCS) of a packet to be transmitted to this communication partner is determined, based on information of this path loss and a packet loss rate (an MCS is an index number which shows a combination of a Phy rate, an encoding rate, and a modulation system used for packet transmission). However, the above described estimation method of a path loss will have a precondition of the transmission power of a terminal station which becomes a communication partner being fixed (or already known). In the case where each terminal station performs transmission power control, the transmission power is not fixed, and so a path loss is not able to be estimated by measuring an RSSI. Therefore, a terminal station is not able to select an appropriate MCS, and efficient use of a channel becomes difficult.

Accordingly, in the technology disclosed in the present disclosure, in a wireless network to which an access system is applied based on CSMA, at least one part of a terminal station suppresses interference to other terminal stations, and causes a transmission opportunity of other terminal stations to not be wastefully reduced, by controlling the transmission power based on an influence degree given to surrounding terminal stations by data transmission of the station itself.

FIG. 1 shows a configuration of a wireless communication apparatus 100, applying the technology disclosed in the present disclosure, which can operate as a terminal station in a wireless network to which an access system is applied based on CSMA. The substance of the wireless communication apparatus 100 is one of various types of information devices in which a wireless LAN function is installed, such as a multifunctional information terminal such as a personal computer or a smartphone, a network printer, or a network drive, in addition to a wireless device.

The illustrated wireless communication apparatus 100 includes a transmission unit 110, a reception unit 120, a transmission and reception antenna 101 shared by the transmission unit 110 and the reception unit 120, and an upper layer processing unit 130 which performs the processes of transmission data to be transmitted from the transmission unit 110 and reception data received by reception unit 120. The transmission unit 110 and the reception unit 120 mainly perform processes of a physical (Phy) layer. Further, the upper layer processing unit 130 performs processes of a media connection control (Media Access Control: MAC) based on CSMA, and processes corresponding to an upper layer more than that of a MAC layer.

The upper layer processing unit 130 starts a prescribed application, for example, in accordance with a request of a user or the like. The application generates transmission data to be transmitted to a terminal station which becomes a communication partner, and performs a process of reception data which can be sent from the communication partner.

The transmission unit 110 includes a channel encoding unit 111, a modulation unit 112, an RF transmission unit 113, and a transmission power control unit 114.

The channel encoding unit 111 encodes the transmission data handed over from the upper layer processing unit 130, and additionally performs error correction encoding. The modulation unit 112 applies a modulation process such as OFDM to the error correction encoded transmission data. Also, the RF transmission unit 113 converts a digital signal after being modulated into an analogue signal, additionally performs an RF transmission process such as up-conversion or power amplification to an RF band, and afterwards performs sending from the antenna 101. The transmission power control unit 114 outputs an instruction value of power amplification to the RF transmission unit 113, in accordance with an instruction from an influence degree estimation unit 124, which will be described below, and controls the transmission power.

The reception unit 120 includes an RF reception unit 121, a demodulation unit 122, a channel decoding unit 123, an influence degree estimation unit 124, and a signal detection capability control unit 125.

The RF reception unit 121 performs an RF reception process such as low noise amplification, down-conversion, or conversion to a digital signal, of a signal received by the antenna 101. The demodulation unit 122 applies a demodulation process such as OFDM to a received digital signal. Also, the channel decoding unit 123 decodes reception data after being demodulated, and hands it over to the upper layer processing unit 130, by additionally performing error correction.

The signal detection capability control unit 125 changes a signal detection capability in the demodulation unit 122 within the reception unit 120, for example, in accordance with an instruction from the influence degree estimation unit 124. Here, signal detection generally detects the presence of signal with a preamble portion of a received packet, and is attached to a position as a part of a synchronization process. Therefore, the signal detection capability control unit 125 can control the signal detection capability by changing a threshold set for preamble detection. Alternatively, in the case where a switch and attenuator are inserted into a signal reception system and the signal detection capability is wanted to be lowered, a means can be taken for adopting a reception signal as a reception signal via an attenuator. Alternatively, a means can be taken for adjusting a bit width of AD conversion. In the case where the signal detection capability is lowered, a large quantitative error is allowed by performing AD conversion with a small bit width, and an SNR of a received signal is caused to be equivalently reduced.

The influence degree estimation unit 124 extracts a characteristic amount from transmission data to be input to the channel encoding unit 111 and reception data after being decoded by the channel decoding unit 123, and estimates an influence degree given to surrounding terminal stations at the time when performing data transmission by the present transmission power from the transmission unit 110, based on this extraction result. A traffic amount to be transmitted and received by itself, the number of links, a metric of a path, a stability of a path or the like is extracted, for example, as the characteristic amount. In order for the influence degree estimation unit 124 to extract a traffic amount, the number of packets or a size of packet to be transmitted and received by itself is counted, by monitoring the channel encoding unit 111 and the channel decoding unit 123.

Also, the influence degree estimation unit 124 suppresses interference to other terminal stations, and arbitrarily outputs a change instruction of the transmission power to the transmission power control unit 114, so as not to cause a transmission opportunity of other terminal stations to be reduced. Further, the influence degree estimation unit 124 instructs a change of the signal detection capability in the demodulation unit 122 to the signal detection capability control unit 125, so that a transmittable range from the transmission unit 11 and a receivable range in the reception unit 120 are balanced, in accordance with a change of the transmission power. The details of a control of the transmission power and the signal detection capability will be made in the below description.

Further, in addition to an influence degree given to surrounding terminal stations, the influence degree estimation unit 124 can estimate a communication condition of itself, based on the above described extracted characteristic amount or a measurement value other than this. The stability degree of a communication partner and this path, the room to accept new traffic, the room of a link condition of a peer or the like can be included, for example, as the communication condition of the terminal station itself. The details will refer to the third embodiment, which will be described below.

Note that, the influence degree estimation unit 124 can be arranged, not only in the reception unit 120, but also in a separate location, such as the transmission unit 110 or the upper layer processing unit 130.

Embodiment 1

Here, an embodiment will be described in which a terminal station controls the transmission power in accordance with a traffic amount, in a wireless network in which access control is performed to a media in accordance with an occupancy state of the media.

Figure 2:
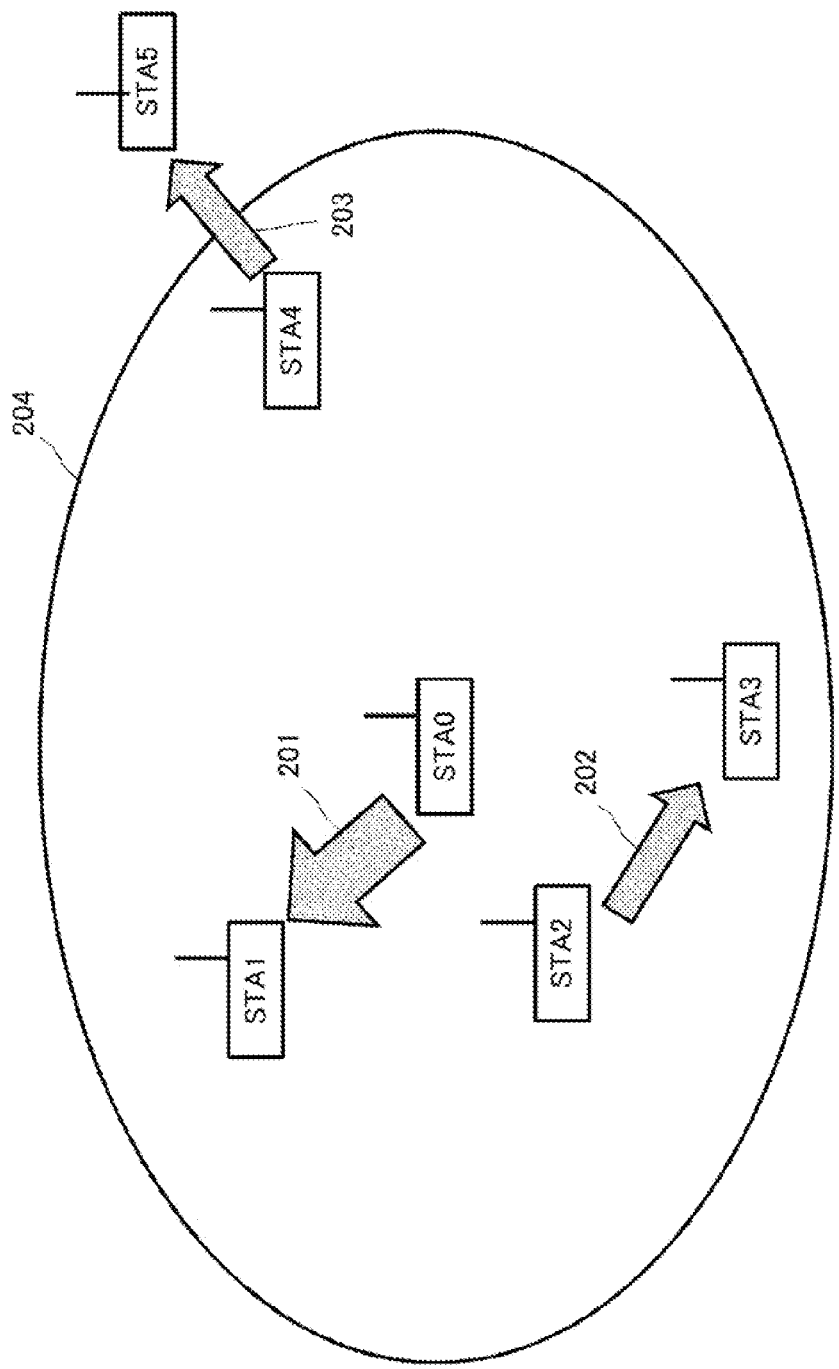
FIG. 2 is a figure which schematically shows a state in which a plurality of terminal stations are performing data transfer on a same channel by using a wireless network (however, with no transmission power control).

FIG. 2 schematically shows a state in which a plurality of terminal stations are performing data transfer on a same channel by using a wireless network. However, in the same figure, each of the terminal stations are not performing a control of the transmission power.

In the illustrated example, 6 terminal stations from STA0 up to STA5 are present. Also, data transmission is performed from the STA0 to the STA1, in the direction shown by arrow 201, data transmission is performed from the STA2 to the STA3, in the direction shown by arrow 202, and data transmission is performed from the STA4 to the STA5, in the direction shown by arrow 203. Note that, here, it is assumed to be the case where each terminal station is connected by peer-to-peer and performs transfer, such as Wi-Fi Direct or a mesh network. Further, the transmittable range of the STA0 in the case where not controlling the transmission power is represented by the oval shown by reference numeral 204. While the STA1, 2, 3, and 4 are within the transmittable range 204 of the STA0, the STA5 is outside of this.

Figure 3:
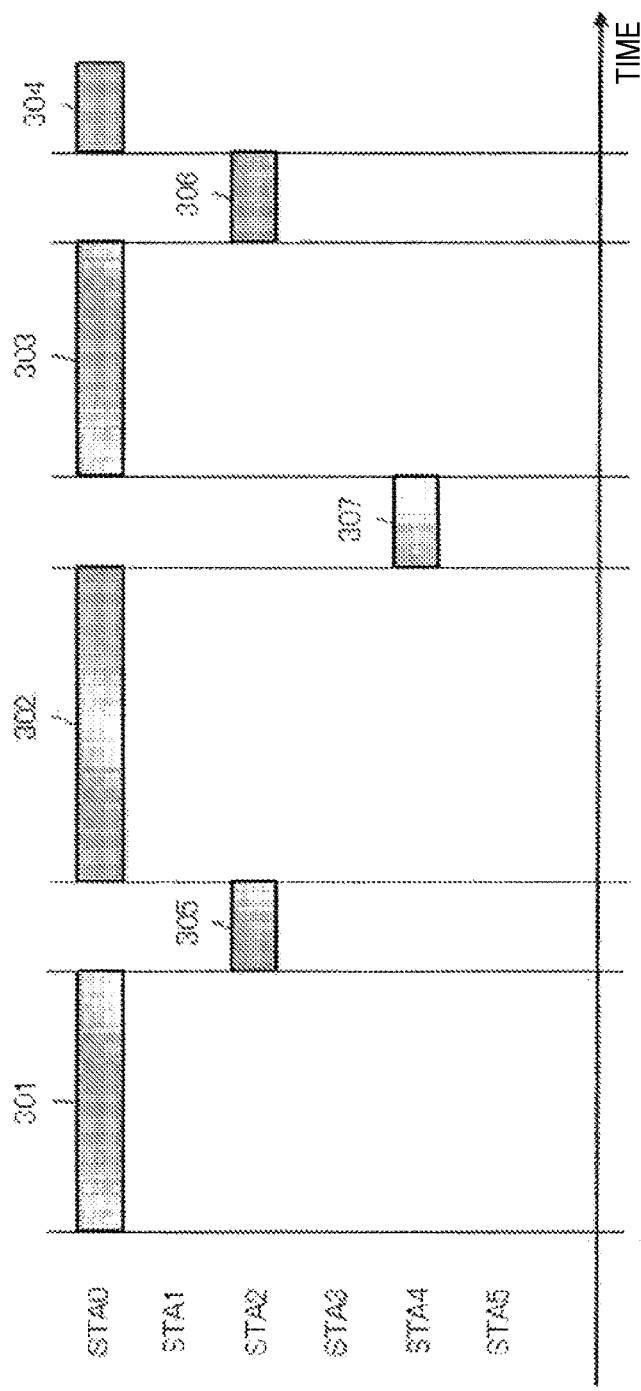
FIG. 3 is a figure which schematically shows an example of a usage condition of the channel in the network environment shown in FIG. 2.

Further, FIG. 3 schematically shows an example of a usage condition of the channel in the network environment shown in FIG. 2. Within the figure, the horizontal axis is set to a time axis, and channel occupation times 301 to 307 of each terminal station are shown by gray blocks.

The STA1, 2, 3, and 4 can receive a transmission signal from the STA0. Accordingly, it may be necessary for these terminal stations to stop transmission of data, by detecting an occupancy state of a media, at the time bands 301, 302, 303, and 304 in which the STA0 is performing data transmission. Therefore, in the case where a traffic amount of the STA0 is large, the STA1, 2, 3, and 4 will have a reduced opportunity of data transmission.

In a media access control system by CSMA, a transmission opportunity is allocated equally to all of the terminal stations including the STA0. However, in the case where a traffic amount of the STA0 obtaining a transmission opportunity is large, there will be a reduction of a transmission opportunity of the terminal stations other than this.

Figure 4:
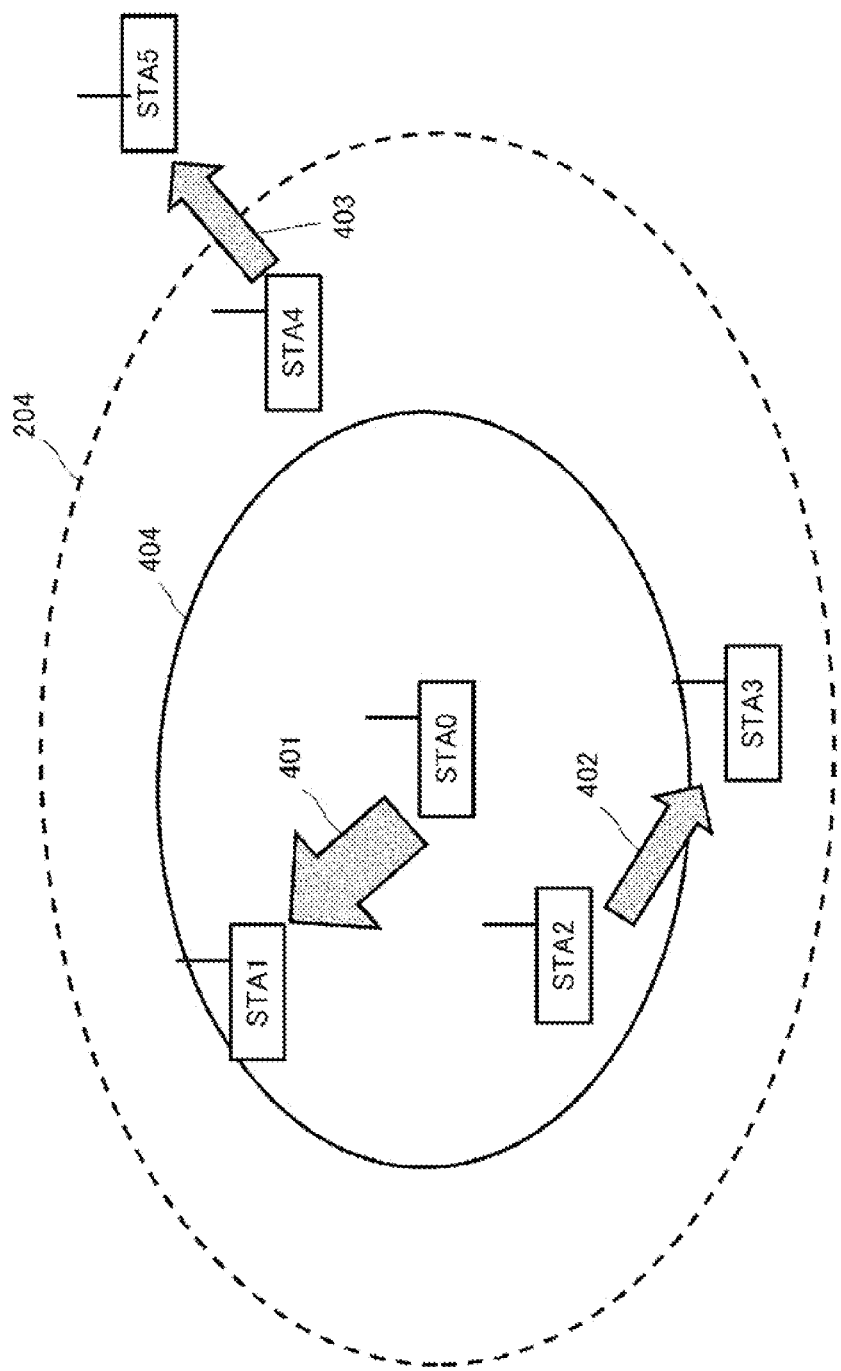
FIG. 4 is a figure which schematically shows a state in which a plurality of terminal stations are performing data transfer on a same channel by using a wireless network (however, with transmission power control).

On the other hand, FIG. 4 schematically shows a state in which a plurality of terminal stations are performing data transfer on a same channel by using a wireless network, in the case where transmission power control is performed.

In the example shown in FIG. 4, data transmission is performed from the STA0 to the STA1, in the direction shown by arrow 401, data transmission is performed from the STA2 to the STA3, in the direction shown by arrow 402, and data transmission is performed from the STA4 to the STA5, in the direction shown by arrow 403.

Here, when an increase of a traffic amount to be transferred by itself is perceived, the STA0 examines a change of the transmission power. Specifically, the STA0 calculates a minimum transmission power which becomes a necessary minimum limit at which data transmission is capable, by taking into consideration a path loss with the STA1 which is a communication partner, a necessary data transfer speed, and a Quality of Service (QoS). Then, the STA0 performs data transfer to the STA1, by using the obtained transmission power. In this way, as shown in FIG. 4, the transmittable range of the STA0 narrows such as shown by the reference numeral 404, and the STA3 and the STA4 are outside from this range.

At this time, by also adjusting the transmittable range of the STA3 and the STA4, the STA3 and the STA4 can occupancy the channel, regardless of the presence or not of data transmission of the STA0, when it is assumed that an electric wave does not reach to the STA0.

Figure 5:
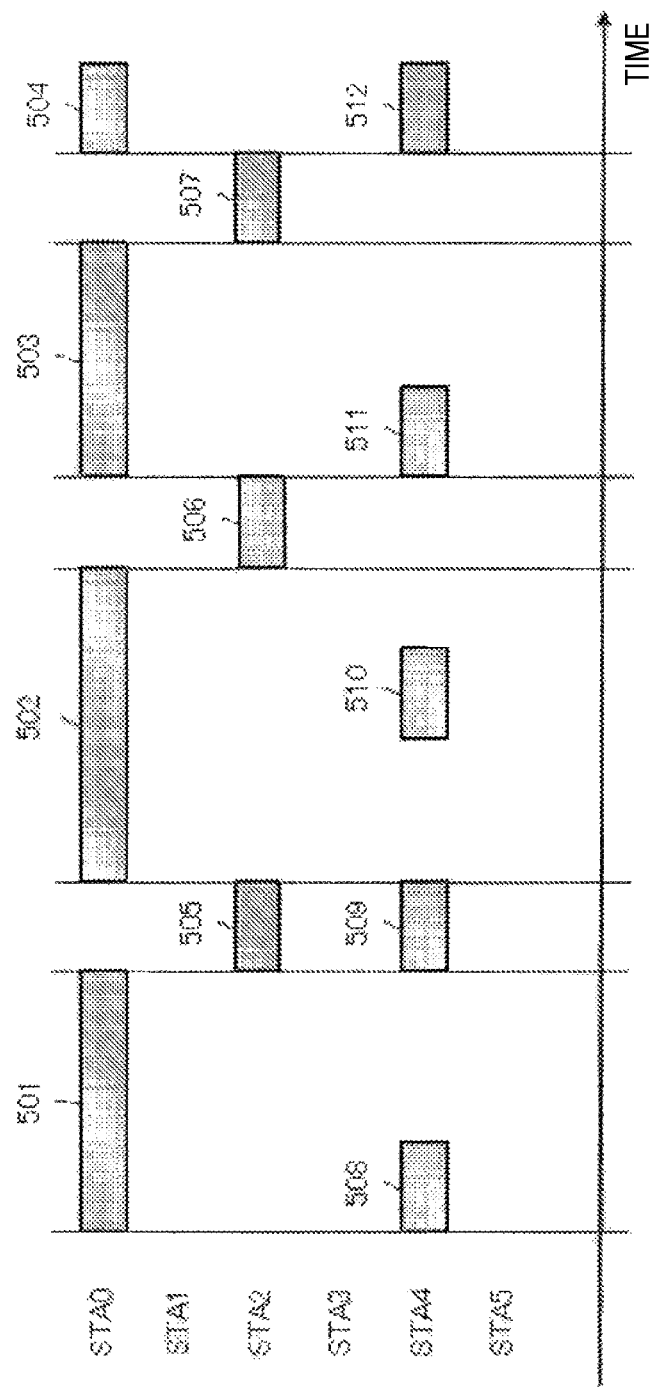
FIG. 5 is a figure which schematically shows an example of a usage condition of the channel in the network environment shown in FIG. 4.

FIG. 5 schematically shows an example of a usage condition of the channel in the network environment shown in FIG. 4. Within the figure, the horizontal axis is set to a time axis, and channel occupation times 501 to 512 of each terminal station are shown by gray blocks. As illustrated, it is possible to perform data transfer by using a same channel, in the time bands 508, 509, 510, 511, and 512 which overlap with the time bands 501, 502, 503, and 504 in which the STA0 is performing data transmission. In this way, by having the STA0 control the transmission power, a reduction of a transmission opportunity of surrounding terminal stations can be prevented.

Note that, while an illustration is omitted, in the case where a traffic amount to be handled by itself is low, the STA0 considers that there is a low probability of causing a transmission opportunity of other terminal stations to be reduced, and performs data transfer by setting to a usual transmission power.

Figure 6:
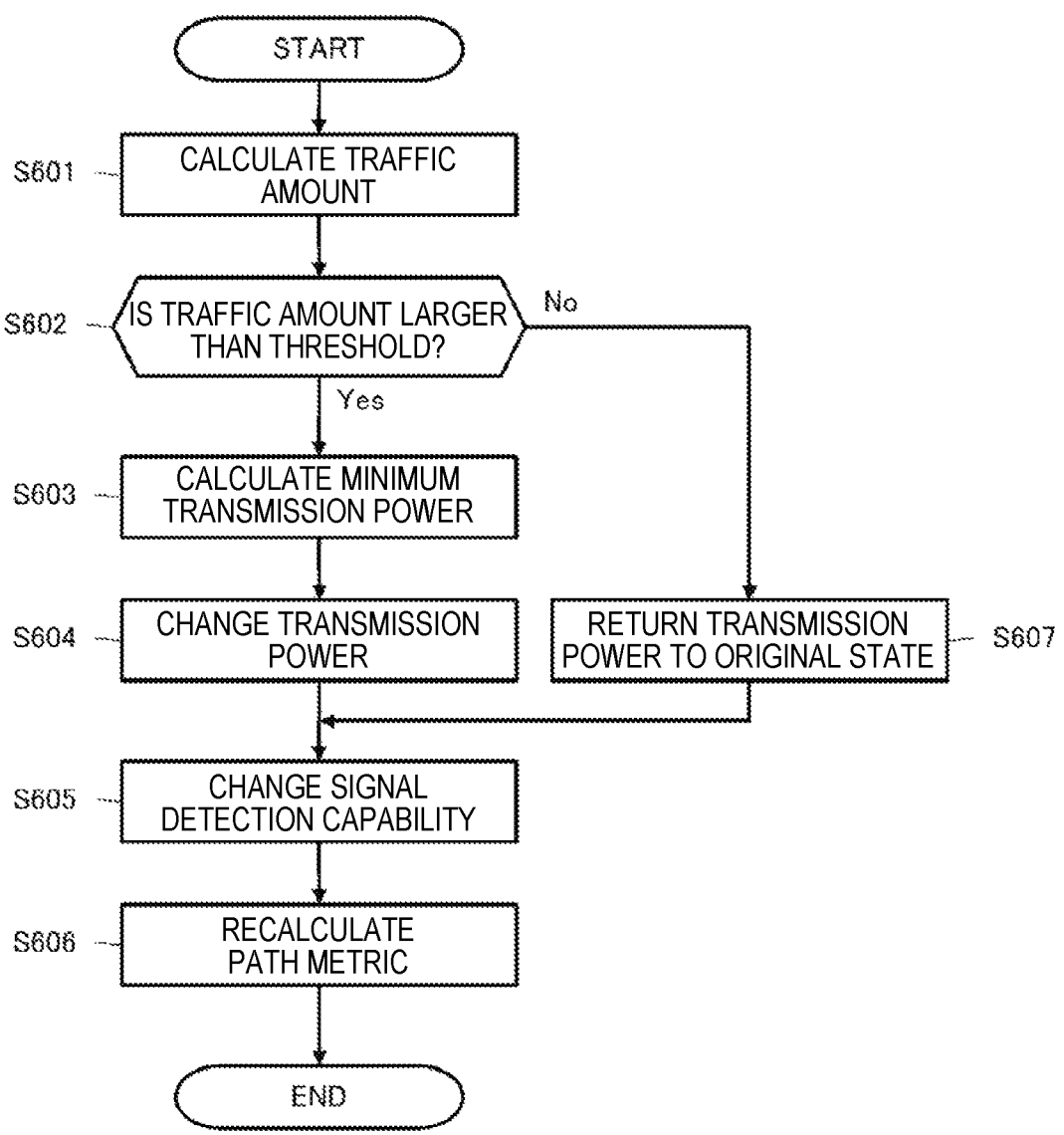
FIG. 6 is a flow chart which shows a process procedure for the wireless communication apparatus 100 to control a transmission power in accordance with a traffic amount of itself.

FIG. 6 shows a process procedure, in the form of a flow chart, for the wireless communication apparatus 100, which operates as the STA0, to control the transmission power in accordance with a traffic amount of itself.

The influence degree estimation unit 124 counts the number of packets or a size of packet to be transmitted and received by itself, by monitoring the channel encoding unit 111 and the channel decoding unit 123, and measures a traffic amount to be handled by this wireless communication apparatus 100, as an influence degree given to surrounding terminal stations (step S601).

Then, the influence degree estimation unit 124 checks whether or not the obtained traffic amount exceeds a prescribed threshold (step S602).

Here, in the case where the traffic amount exceeds a prescribed threshold (Yes in step S602), an instruction is output from the influence degree estimation unit 124 to the transmission power control unit 114, so as to perform a change of the transmission power to be data transmitted from the transmission unit 110.

In order for a change of the transmission power, first, a minimum transmission power is calculated (step S603). A minimum transmission power is a transmission power which becomes a necessary minimum limit at which the present data transfer is able to be retained. A minimum transmission power is calculated, for example, in the influence degree estimation unit 123 or the upper layer processing unit 130, based on a data transfer speed necessary for presently transferred data, path loss information obtained from an RSSI or MCS, and a QoS of data.

Then, the transmission power control unit 114 outputs an instruction of power amplification to the RF transmission unit 113, so as to change to the minimum transmission power (step S604). Note that, the calculated transmission power is used for all of the transmission packets including a beacon.

By using a minimal transmission power corresponding to the service of data to be transferred or a QoS, the STA0 performing data transfer can suppress interference to other terminal stations, and can prevent a reduction of a transmission opportunity of other terminal stations.

On the other hand, in the case where the traffic amount does not exceed a prescribed threshold (No in step S602), it can be considered that there is a low possibility of causing a transmission opportunity of surrounding terminal stations to be reduced. Accordingly, the influence degree estimation unit 124 performs an instruction to the transmission power control unit 114 so as to return, to the original state, the transmission power reduced to the minimum transmission power (step S607), and secures a transmittable range of the station itself.

At the time when the transmission power is changed in step S604 or step S607, in combination with this, the signal detection capability control unit 125 performs an adjustment so as to not detect a packet received with a low power, by changing the signal detection capability in the demodulation unit 122 within the reception unit 120 (step S605). However, it will be arbitrary whether or not an adjustment of the signal detection capability is also performed, along with a change of the transmission power.

Further, at the time when the transmission power is changed in step S604 or step S607, there will be the possibility that discrepancies in the actual value are produced with the calculated path metric, and defects occur such as a packet loss of the transmission data. Accordingly, a recalculation of the path metric is executed (step S606). For example, a recalculation of the path metric is executed, by having the wireless communication apparatus 100 transmit a path request (PREQ) at the time when operating as a transmission source of multi-hop transmission, or transmit a path error (PERR) at the time when operating as a relay station. By changing the transmission power, and afterwards performing a recalculation of the metric by the transmission of a PREQ or PERR, it becomes possible for a terminal station to select a path corresponding to the transmission power at an early stage. However, it will be arbitrary whether or not a recalculation of the path metric is also performed, along with a change of the transmission power.

Figure 7:
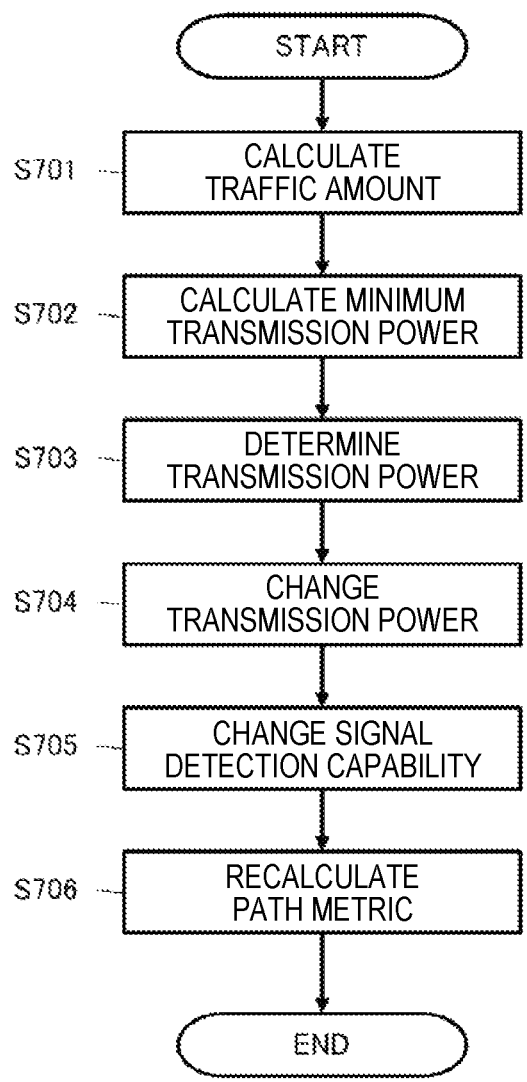
FIG. 7 is a flow chart which shows another process procedure for the wireless communication apparatus 100 to control a transmission power in accordance with a traffic amount of itself.

Further, FIG. 7 shows another process procedure, in the form of a flow chart, for the wireless communication apparatus 100, which operates as the STA0, to control the transmission power in accordance with a traffic amount of itself.

First, the influence degree estimation unit 124 counts the number of packets or a size of packet to be transmitted and received by itself, by monitoring the channel encoding unit 111 and the channel decoding unit 123, and measures a traffic amount to be handled by this wireless communication apparatus 100, as an influence degree given to surrounding terminal stations (step S601).

Next, in order for a change of the transmission power, first, a minimum transmission power is calculated (step S702). A minimum transmission power is a transmission power which becomes a necessary minimum limit at which the present data transfer is able to be retained. A minimum transmission power is calculated, for example, in the influence degree estimation unit 123 or the upper layer processing unit 130, based on a data transfer speed necessary for presently transferred data, path loss information obtained from an RSSI or MCS, and a QoS of data (same as above).

Then, when the transmission power is determined, based on a relationship between the traffic amount obtained in step S701 and the minimum transmission power obtained in step S702 (step S703), the transmission power determination unit 114 outputs an instruction of power amplification to the RF transmission unit 113, so as to change to this transmission power (step S704). Note that, the changed transmission power is used for all of the transmission packets including a beacon.

Next, the signal detection capability control unit 125 performs an adjustment so as to not detect a packet received with a low power, by changing the signal detection capability in the demodulation unit 122 within the reception unit 120 (step S705). However, it will be arbitrary whether or not an adjustment of the signal detection capability is also performed, along with a change of the transmission power.

Further, since discrepancies in the actual value are produced with the calculated path metric, and defects occur such as a packet loss of the transmission data, by the transmission power after being changed, a recalculation of the path metric is executed (step S706). However, it will be arbitrary whether or not a recalculation of the path metric is also performed, along with a change of the transmission power.

Here, a supplemental remark will be described for a method which determines the transmission power based on a relationship between the traffic amount and the minimum transmission power in step S703.

For example, a look-up-table which obtains a transmission power from the traffic amount and the minimum transmission power can be created in advance based on experiments, simulation calculations or the like, this can be stored in a Read Only Memory (ROM) or the like, and a transmission power can be obtained, by applying the values calculated in steps S701 and S702 to this look-up-table.

Figure 8:
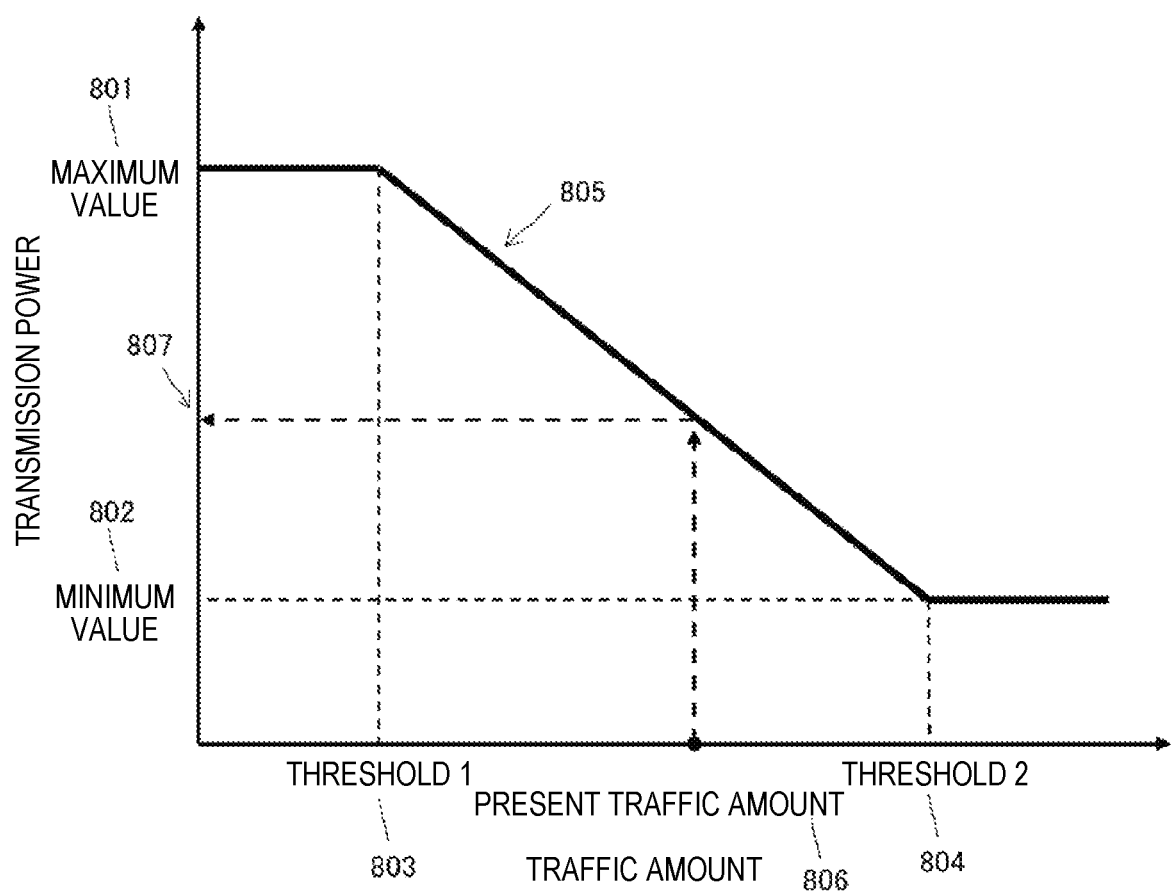
FIG. 8 is a figure which shows a graph representing a relationship between a transmission power and a traffic amount.

Alternatively, an appropriate transmission power can be obtained, by creating a graph representing a relationship between the transmission power and the traffic amount, and applying the traffic amount obtained in step S701 to this graph, such as shown in FIG. 8, based on the values calculated by steps S701 and S702. In the graph shown in FIG. 8, a maximum value 801 of the transmission power is a value, for example, which is determined by an output limit of the RF transmission unit 113 within the transmission unit 110. Further, a minimum value 802 of the transmission power is a transmission power which becomes a necessary minimum limit at which the present data transfer is able to be retained, and is calculated in step S702. Further, a lower threshold 1 and an upper threshold 2 of the traffic amount shown by reference numerals 803 and 804 are determined by a request or the like of an application which requests data transfer.

In this way, when the present traffic amount 806 obtained in step S701 is applied to the obtained graph 805, a transmission power 807 is determined.

Further, a supplemental remark will be described for a control of the signal detection capability of the reception unit 120, performed in steps S604 and S704.

When each of the terminal stations individually perform transmission power control such as described above, a condition will occur in which the transmission power is different according to the terminal stations. In such a case, there is a high possibility that the terminal station with the largest transmission power will obtain a transmission opportunity, and there is a concern that a transmission opportunity will become non-uniform for each of the terminal stations.

Figure 9:
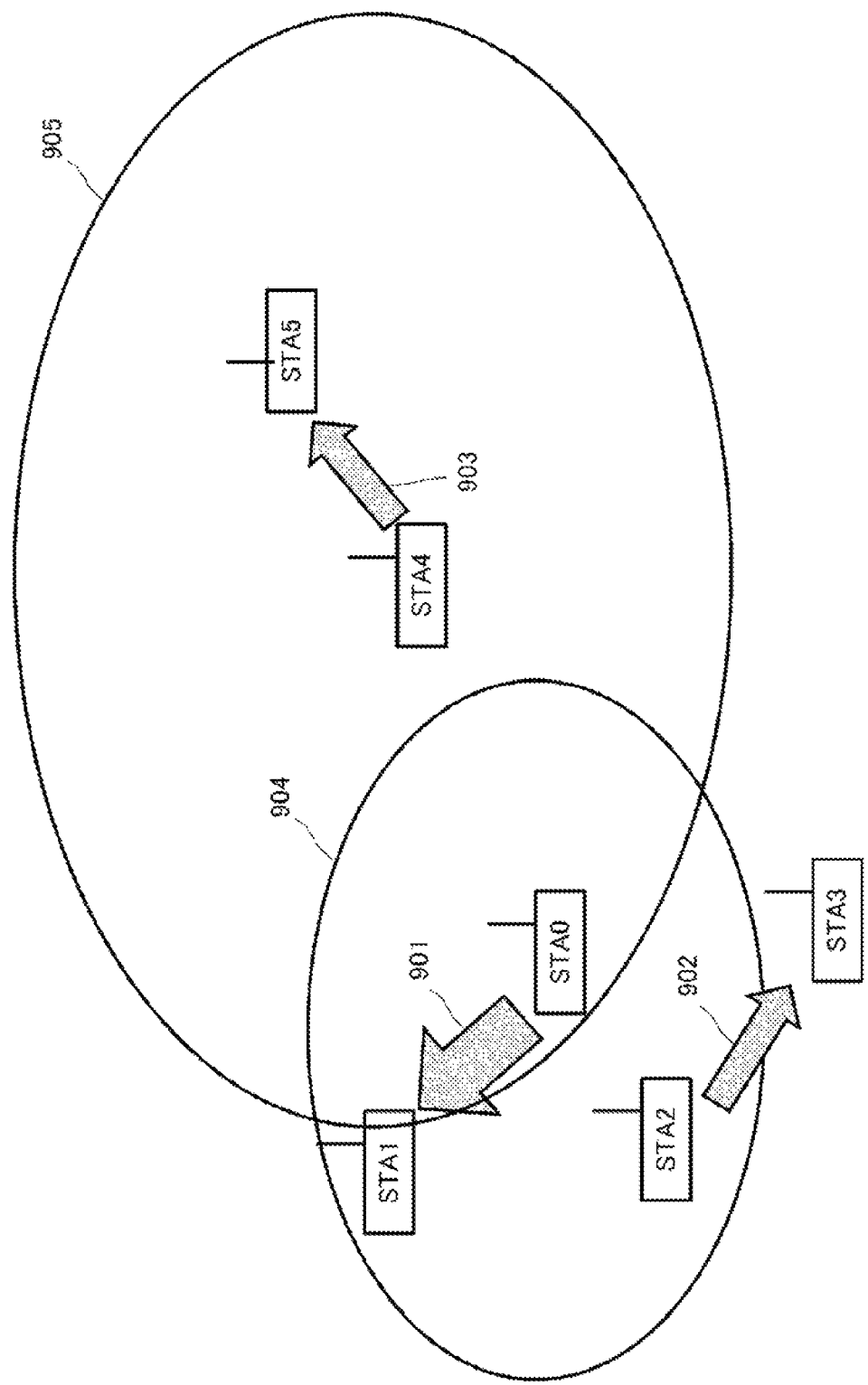
FIG. 9 is a figure which illustrates a wireless network environment in which a transmittable range becomes non-uniform for each terminal station.

FIG. 9 illustrates a wireless network environment in which a transmittable range becomes non-uniform for each of the terminal stations. In the illustrated example, 6 terminal stations from STA0 up to STA5 are present. Also, data transmission from the STA0 to the STA1 is performed, in the direction shown by arrow 901, data transmission from the STA2 to the STA3 is performed, in the direction shown by arrow 902, and data transmission from the STA4 to the STA5 is performed, in the direction shown by arrow 903. Note that, here, it is assumed to be the case where each terminal station is connected by peer-to-peer and performs transfer, such as Wi-Fi Direct or a mesh network.

The STA0 lowers the transmission power. The transmittable range of the STA0 becomes small, such as represented by the oval shown by reference numeral 904. On the other hand, the STA4 keeps a large transmission power. The transmittable range of the STA4 is represented by the oval shown by reference numeral 905, and includes the STA0. When wireless access is performed based on CSMA in such a condition, the STA0 can detect a signal transmitted from the STA4, and so can stop a transmission of data, for example, when receiving an RTS packet of the STA4. On the other hand, the STA4 is not able to detect a signal of the STA0, and so is capable of performing data transmission of itself, for example, without detecting an RTS packet of the STA0.

Since such a non-uniformity of the transmission opportunity reduces, the STA0 performs a control together with the signal detection capability of itself, at the time when changing the transmission power. That is, in the STA0, a threshold of signal detection changes in the demodulation unit 122 within the reception unit 120. The STA0 narrows the signal detection range, by raising a threshold of signal detection in the demodulation unit 122, at the time when reducing the transmission power of itself.

Figure 10:
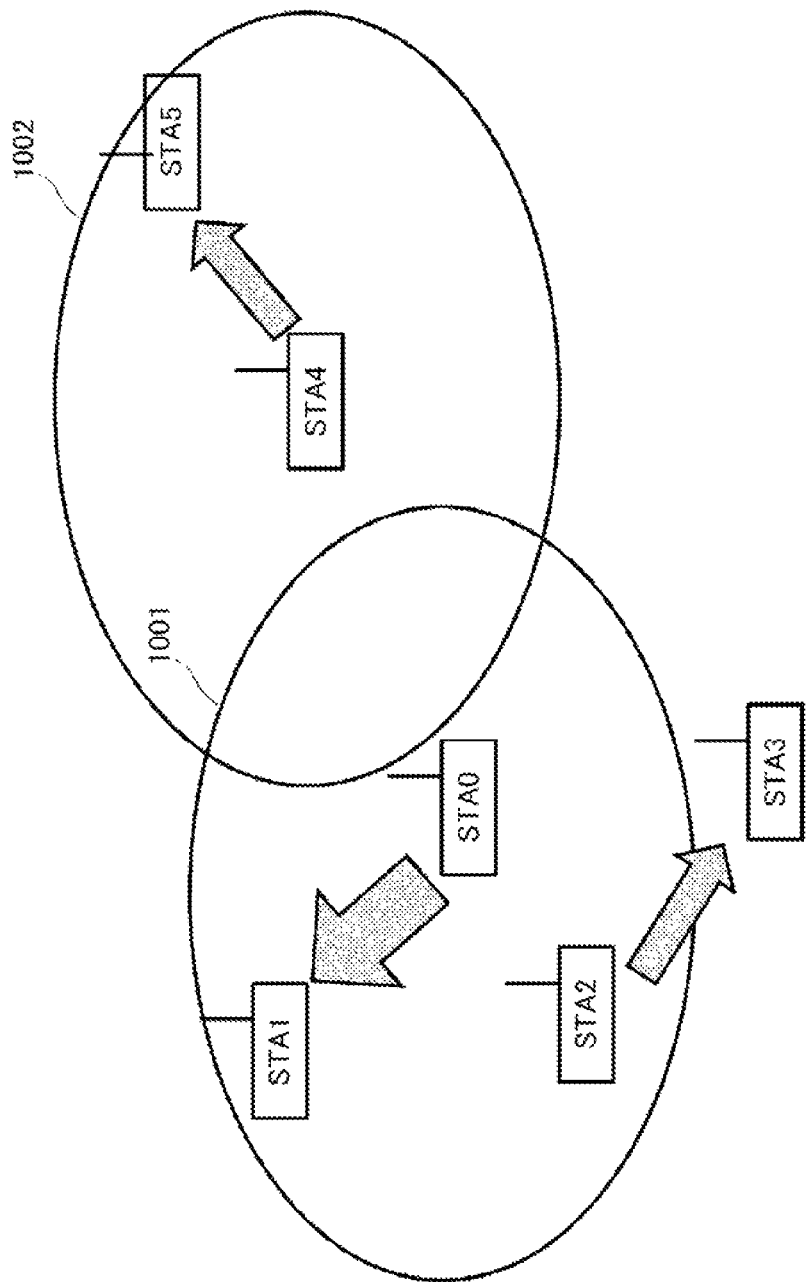
FIG. 10 is a figure which shows a virtual transmittable range of another terminal station for a terminal station which has a threshold of signal detection raised.

FIG. 10 shows a virtual transmittable range of the STA4 for the STA0, at the time when the STA0 raises a threshold of signal detection. As illustrated, at the time when the STA0 reduces a transmittable range 1001 of itself, an effect similar to narrowing the transmittable range of the STA4 such as shown by reference numeral 1002 can be obtained, by additionally narrowing the signal detection range. Since the STA0 is not able to detect a signal of the STA4, it becomes possible to perform data transmission of itself, for example, without detecting an RTS packet of the STA4.

Further, a supplemental remark will be described for a recalculation of the path metric, performed in steps S605 and S705.

In order to select a path, in a wireless mesh network including IEEE802.11s, a value which shows the closeness of the path, that is, a path metric, is calculated. In IEEE802.11s, the time which a channel is occupied at the time when transmitting a data frame, calculated from a transmission speed of a physical layer, a packet error rate or the like, is prescribed as a default path metric.

In a wireless network, it is assumed that the condition of the propagation environment and each of the terminal stations changes moment by moment. Accordingly, a calculation of the path metric is performed at fixed time intervals. However, when a terminal station changes the transmission power or the signal detection capability such as described above, there will be a high possibility that discrepancies in the actual value are produced with the calculated path metric, and defects occur such as a packet loss of the transmission data. Therefore, in the case where changing the transmission power or the signal detection capability of itself, it is preferable for a terminal station to perform a recalculation of the path metric.

A recalculation of the path metric is executed by having a terminal station of a transmission source transmit a path request PREQ packet, similar to at the time of a usual path signal. However, at the time when a terminal station, which is a relay node and not a transmission source of data, changes the transmission power, a path metric is not able to be obtained by a method which transmits a PREQ. Accordingly, a terminal station, which is a relay node, transmits a path error PERR packet to a terminal station of a transmission source. PERR is originally used in the case where a mesh path set for a deterioration of a wireless link or the like is not able to be used, and prompts a refresh of the mesh path (a recalculation of the path metric) to a transmission source. Therefore, the path metric is recalculated according to this operation.

According to the first embodiment, by causing the transmission power to be reduced, at the time when a traffic amount to be transmitted and received by itself increases, a terminal station which performs wireless access based on CSMA on a mesh network can suppress interference to other surrounding terminal stations, and can prevent a reduction of a transmission opportunity of other terminal stations. That is, the above described problems (1) and (2) can be solved. By measuring the number of and sizes of packets to be transmitted and received, it is possible for a terminal station to comprehend the traffic amount to be transmitted and received by itself, and perform a control of the transmission power by this.

Further, according to the first embodiment, by using a minimal transmission power corresponding to the service of data to be transferred or a QoS, a terminal station can suppress interference to other terminal stations, and can prevent a reduction of a transmission opportunity of other terminal stations.

Further, according to the first embodiment, by performing a change of a signal detection capability together with a change in a transmission power of itself, a terminal station can reduce the non-uniformity of a transmission opportunity between terminal stations.

Further, according to the first embodiment, by changing a transmission power or a signal detection capability of itself, and afterwards performing a recalculation of a path metric by the transmission of a PREQ or PERR, it becomes possible for a terminal station to perform a selection of a path corresponding to the transmission power at an early stage.

Embodiment 2

Here, an embodiment will be described in which a terminal station controls the transmission power in accordance with the number of links.

Figure 11:
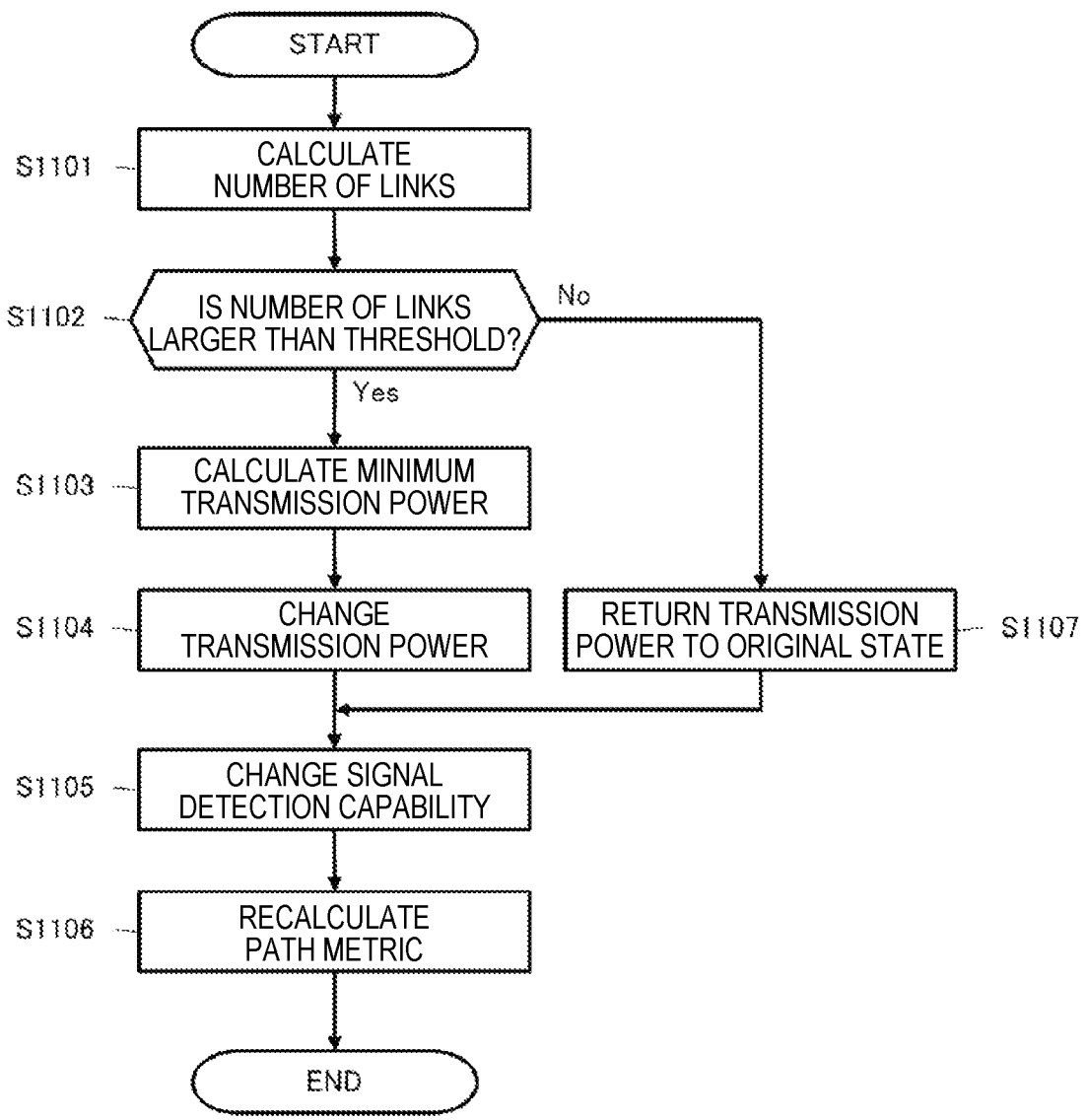
FIG. 11 is a flow chart which shows a process procedure for the wireless communication apparatus 100 to control a transmission power in accordance with the number of presently handled links.

There is a high possibility that a terminal station with a large number of current links will perform communication with many terminals. That is, it is suggested that there is a high number of terminal stations which receive an influence due to a channel occupation of a terminal station with a large number of links. Therefore, it can be considered that, by reducing the transmission power of a terminal with a large number of links, a reduction of a transmission opportunity of other terminal stations can be prevented. FIG. 11 shows a process procedure, in the form of a flow chart, for the wireless communication apparatus 100 to control the transmission power in accordance with the number of presently handled links.

The influence degree estimation unit 124 measures a link number presently handled by this wireless communication apparatus 100, as an influence degree given to surrounding terminal stations (step S1101).

Then, the influence degree estimation unit 124 checks whether or not the obtained number of links exceeds a prescribed threshold (step S1102).

Here, in the case where the number of links exceeds a prescribed threshold (Yes in step S1102), an instruction is output from the influence degree estimation unit 124 to the transmission power control unit 114, so as to perform a change of the transmission power to be data transmitted from the transmission unit 110.

In order for a change of the transmission power, first, a minimum transmission power is calculated (step S1103). A minimum transmission power is a transmission power which becomes a necessary minimum limit at which the present data transfer is able to be retained. A minimum transmission power is calculated, for example, in the influence degree estimation unit 123 or the upper layer processing unit 130, based on a data transfer speed necessary for presently transferred data, path loss information obtained from an RSSI or MCS, and a QoS of data.

Then, the transmission power control unit 114 outputs an instruction of power amplification to the RF transmission unit 113, so as to change to the minimum transmission power (step S1104). Note that, the calculated transmission power is used for all of the transmission packets including a beacon.

By causing the transmission power to be reduced in accordance with an increase of the number of links to be handled, a terminal station can suppress interference to other terminal stations, and can cause a transmission opportunity of other terminal stations to be improved.

On the other hand, in the case where the number of links currently handled does not exceed a prescribed threshold (No in step S1102), it can be considered that there is a low possibility of causing a transmission opportunity of surrounding terminal stations to be reduced. Accordingly, the influence degree estimation unit 124 performs an instruction to the transmission power control unit 114 so as to return, to the original state, the transmission power reduced to the minimum transmission power (step S1107), and secures a transmittable range of the station itself.

At the time when the transmission power is changed in step S1104 or step S1107, in combination with this, the signal detection capability control unit 125 performs an adjustment so as to not detect a packet received with a low power, by changing the signal detection capability in the demodulation unit 122 within the reception unit 120 (step S1105) (same as above). However, it will be arbitrary whether or not an adjustment of the signal detection capability is also performed, along with a change of the transmission power.

Further, at the time when the transmission power is changed in step S1104 or step S1107, there will be the possibility that discrepancies in the actual value are produced with the calculated path metric, and defects occur such as a packet loss of the transmission data. Accordingly, a recalculation of the path metric is executed (step S1106). For example, a recalculation of the path metric is executed, by having the wireless communication apparatus 100 transmit a path request (PREQ) at the time when operating as a transmission source of multi-hop transmission, or transmit a path error (PERR) at the time when operating as a relay station. By changing the transmission power, and afterwards performing a recalculation of the metric by the transmission of a PREQ or PERR, it becomes possible for a terminal station to select a path corresponding to the transmission power at an early stage (same as above). However, it will be arbitrary whether or not a recalculation of the path metric is also performed, along with a change of the transmission power.

Figure 12:
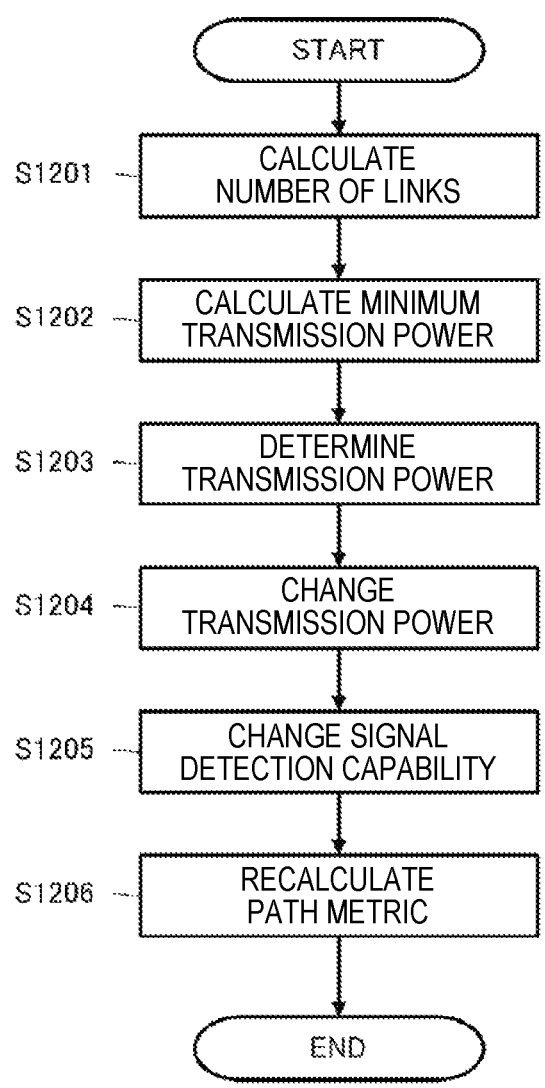
FIG. 12 is a flow chart which shows another process procedure for the wireless communication apparatus 100 to control a transmission power in accordance with the number of presently handled links.

Further, FIG. 12 shows another process procedure, in the form of a flow chart, for the wireless communication apparatus 100 to control the transmission power in accordance with the number of presently handled links.

First, the influence degree estimation unit 124 measures the number of links currently handled by this wireless communication apparatus 100, as an influence degree given to surrounding terminal stations (step S1201).

Next, in order for a change of the transmission power, first, a minimum transmission power is calculated (step S1202). A minimum transmission power is a transmission power which becomes a necessary minimum limit at which the present data transfer is able to be retained. A minimum transmission power is calculated, for example, in the influence degree estimation unit 123 or the upper layer processing unit 130, based on a data transfer speed necessary for presently transferred data, path loss information obtained from an RSSI or MCS, and a QoS of data (same as above).

Then, when the transmission power is determined, based on a relationship between the number of links obtained in step S1201 and the minimum transmission power obtained in step S1202 (step S1203), the transmission power determination unit 114 outputs an instruction of power amplification to the RF transmission unit 113, so as to change to this transmission power (step S1204). Note that, the changed transmission power is used for all of the transmission packets including a beacon.

Next, the signal detection capability control unit 125 performs an adjustment so as to not detect a packet received with a low power, by changing the signal detection capability in the demodulation unit 122 within the reception unit 120 (step S1205) (same as above). However, it will be arbitrary whether or not an adjustment of the signal detection capability is also performed, along with a change of the transmission power.

Further, since discrepancies in the actual value are produced with the calculated path metric, and defects occur such as a packet loss of the transmission data, by the transmission power after being changed, a recalculation of the path metric is executed (step S1206). However, it will be arbitrary whether or not a recalculation of the path metric is also performed, along with a change of the transmission power.

Here, a supplemental remark will be described for a method which determines the transmission power based on a relationship between the number of links and the minimum transmission power in step S1203.

For example, a look-up-table which obtains a transmission power from the number of links and the minimum transmission power can be created in advance based on experiments, simulation calculations or the like, this can be stored in a Read Only Memory (ROM) or the like, and a transmission power can be obtained, by applying the values calculated in steps S1201 and S1202 to this look-up-table.

Figure 13:
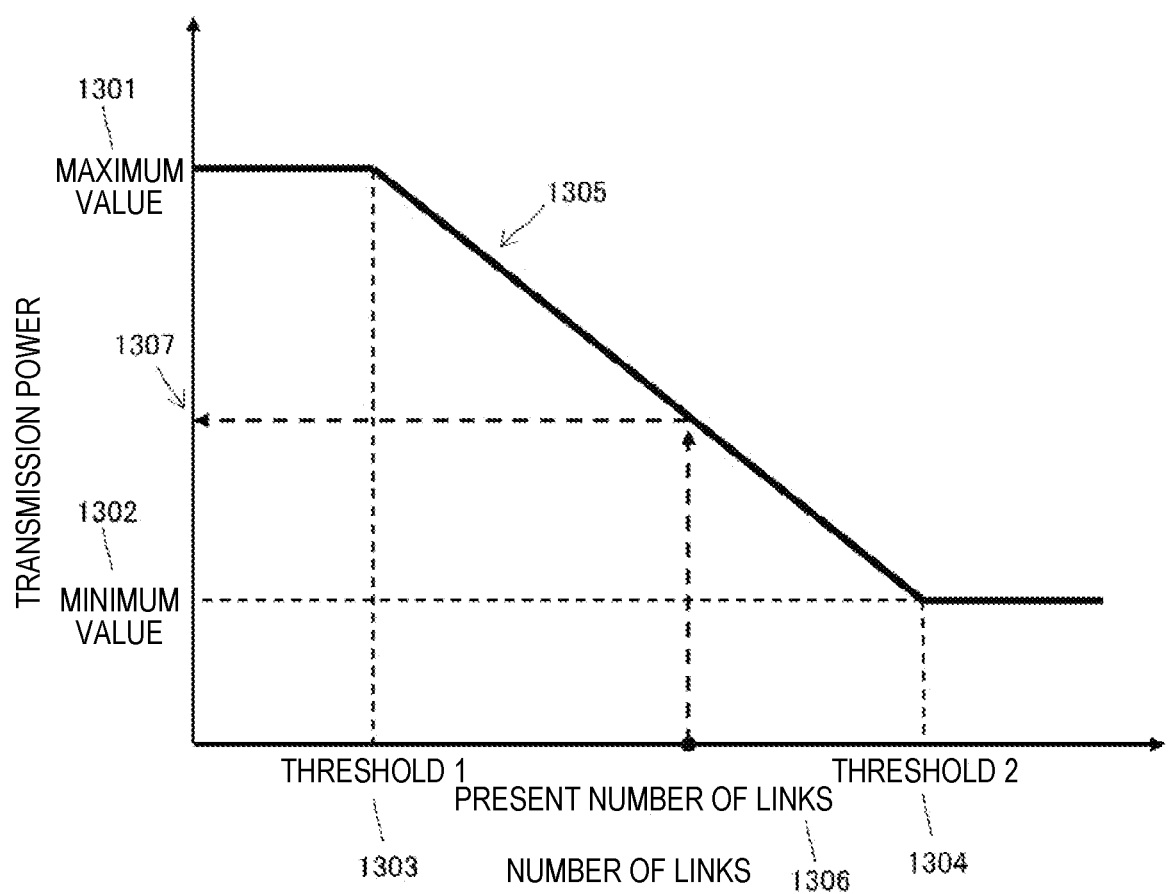
FIG. 13 is a figure which shows a graph representing a relationship between a transmission power and the number of links.

Alternatively, an appropriate transmission power can be obtained, by creating a graph representing a relationship between the transmission power and the number of links, and applying the number of links obtained in step S1201 to this graph, such as shown in FIG. 13, based on the values calculated by steps S1201 and S1202. In the graph shown in FIG. 13, a maximum value 1301 of the transmission power is a value, for example, which is determined by an output limit of the RF transmission unit 113 within the transmission unit 110. Further, a minimum value 1302 of the transmission power is a transmission power which becomes a necessary minimum limit at which the present data transfer is able to be retained, and is calculated in step S1202. Further, a lower threshold 1 and an upper threshold 2 of the number of links shown by reference numerals 1303 and 1304 are determined by a request or the like of an application which requests data transfer. In this way, when the present number of links 1306 obtained in step S1301 is applied to the obtained graph 1305, a transmission power 1307 is determined.

According to the second embodiment, by causing the transmission power to be reduced, at the time when the number of links handled by itself increases, a terminal station which performs wireless access based on CSMA on a mesh network can suppress interference to other surrounding terminal stations, and can prevent a reduction of a transmission opportunity of other terminal stations. That is, the above described problems (1) and (2) can be solved.

Further, according to the second embodiment, by using a minimal transmission power corresponding to the service of data to be transferred or a QoS, a terminal station can suppress interference to other terminal stations, and can prevent a reduction of a transmission opportunity of other terminal stations.

Further, according to the second embodiment, by performing a change of a signal detection capability together with a change in a transmission power of itself, a terminal station can reduce the non-uniformity of a transmission opportunity between terminal stations.

Further, according to the second embodiment, by changing a transmission power or a signal detection capability of itself, and afterwards performing a recalculation of a path metric by the transmission of a PREQ or PERR, it becomes possible for a terminal station to perform a selection of a path corresponding to the transmission power at an early stage.

Embodiment 3

In the first and second embodiments, a terminal station performs a control of the transmission power, by taking into consideration an influence degree given to other terminal stations by data transmission and reception of itself. For example, an influence to other terminal stations is estimated based on a traffic amount to be transmitted and received by itself and the number of handled links, and interference to other terminal stations is suppressed by controlling the transmission power. In contrast to this, in a third embodiment, a terminal station performs a control of the transmission power, by taking into consideration an influence degree given to itself by data transmission and reception of itself.

It is possible for a terminal station to control the transmission power according to the condition of the terminal station itself, regardless of the condition of the surroundings, and an effect by this can also be obtained. Hereinafter, a number of methods will be described in detail in which the transmission power is controlled by the circumstances of a terminal station itself.

(1) Transmission Power Control at the Time when a Communication Partner and this Path are Stable At the time when a communication partner of traffic handled by a terminal station, and this path, are stable, it can be considered that it will be difficult for sudden variations in a wireless link to occur in this terminal station. Therefore, by lowering the transmission power secured as a margin for surely performing data transmission, the terminal station can cause a reduction of a transmission opportunity of other terminal stations to be improved. For example, the stability degree of a path can be estimated based on a variation amount of a path metric, the number of links, and a traffic amount. Accordingly, the influence degree estimation unit 124 estimates the stability degree of a path as an influence degree given to itself by data transmission and reception of itself, and the transmission power control unit 114 performs a control of the transmission power in accordance with the stability degree of the path.

Figure 14:
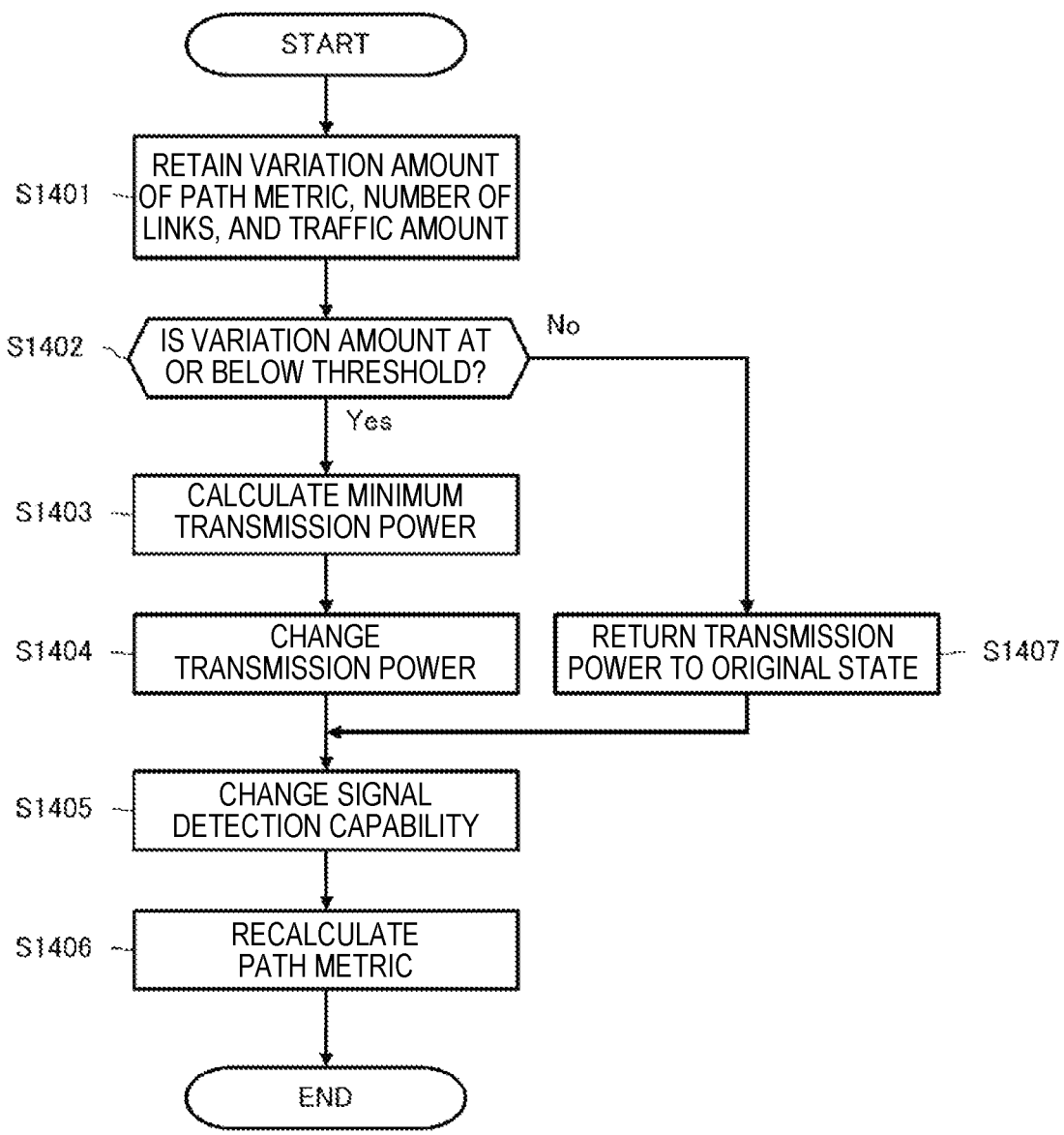
FIG. 14 is a flow chart which shows a process procedure for the wireless communication apparatus 100 to control a transmission power in accordance with a stability degree of a path.

FIG. 14 shows a process procedure, in the form of a flow chart, for the wireless communication apparatus 100 to control the transmission power in accordance with the stability degree of a path.

The influence degree estimation unit 124 measures at least one from among a path metric, the number of links, and a traffic amount only for a fixed time, and retains a variation amount of a past fixed time, as a value which shows the stability degree of a path (step S1401).

Then, the influence degree estimation unit 124 checks whether or not the retained variation amount is at a prescribed threshold or below (step S1402).

Here, in the case where the variation amount is at a prescribed threshold or below (Yes in step S1402), the path of this terminal station can be considered to be stable. Therefore, an instruction is output from the influence degree estimation unit 124 to the transmission power control unit 114, so as to perform a change of the transmission power which performs data transmission from the transmission unit 110.

In order for a change of the transmission power, first, a minimum transmission power is calculated (step S1403). A minimum transmission power is a transmission power which becomes a necessary minimum limit at which the present data transfer is able to be retained. A minimum transmission power is calculated, for example, in the influence degree estimation unit 123 or the upper layer processing unit 130, based on a data transfer speed necessary for presently transferred data, path loss information obtained from an RSSI or MCS, and a QoS of data.

Then, the transmission power control unit 114 outputs an instruction of power amplification to the RF transmission unit 113, so as to change to the minimum transmission power (step S1404). Note that, the calculated transmission power is used for all of the transmission packets including a beacon.

By causing the transmission power to be reduced at the time when a path is stable, a terminal station can suppress interference to other terminal stations, and can cause a transmission opportunity of other terminal stations to be improved.

On the other hand, in the case where the variation amount exceeds a prescribed threshold (No in step S1402), the path of this terminal station can be considered to be not stable. In this case, it can be considered that it may be necessary to secure a margin of the transmission power for surely performing data transmission. Accordingly, the influence degree estimation unit 124 performs an instruction to the transmission power control unit 114 so as to return, to the original state, the transmission power reduced to the minimum transmission power (step S1407).

At the time when the transmission power is changed in step S1404 or step S1407, in combination with this, the signal detection capability control unit 125 performs an adjustment so as to not detect a packet received with a low power, by changing the signal detection capability in the demodulation unit 122 within the reception unit 120 (step S1405) (same as above). However, it will be arbitrary whether or not an adjustment of the signal detection capability is also performed, along with a change of the transmission power.

Further, at the time when the transmission power is changed in step S1404 or step S1407, there will be the possibility that discrepancies in the actual value are produced with the calculated path metric, and defects occur such as a packet loss of the transmission data. Accordingly, a recalculation of the path metric is executed (step S1406). For example, a recalculation of the path metric is executed, by having the wireless communication apparatus 100 transmit a path request (PREQ) at the time when operating as a transmission source of multi-hop transmission, or transmit a path error (PERR) at the time when operating as a relay station. By changing the transmission power, and afterwards performing a recalculation of the metric by the transmission of a PREQ or PERR, it becomes possible for a terminal station to select a path corresponding to the transmission power at an early stage (same as above). However, it will be arbitrary whether or not a recalculation of the path metric is also performed, along with a change of the transmission power.

Figure 15:
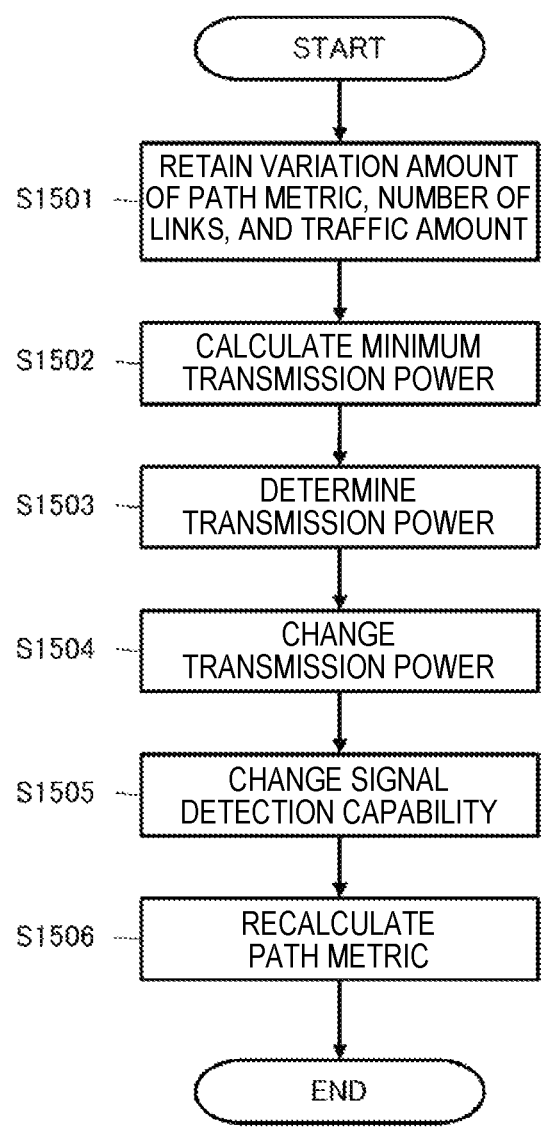
FIG. 15 is a flow chart which shows another process procedure for the wireless communication apparatus 100 to control a transmission power in accordance with a stability degree of a path.

Further, FIG. 15 shows another process procedure, in the form of a flow chart, for the wireless communication apparatus 100 to control the transmission power in accordance with the stability degree of a path.

First, the influence degree estimation unit 124 measures at least one from among a path metric, the number of links, and a traffic amount only for a fixed time, and retains a variation amount of a past fixed time, as a value which shows the stability degree of a path (step S1501).

Next, in order for a change of the transmission power, first, a minimum transmission power is calculated (step S1502). A minimum transmission power is a transmission power which becomes a necessary minimum limit at which the present data transfer is able to be retained. A minimum transmission power is calculated, for example, in the influence degree estimation unit 123 or the upper layer processing unit 130, based on a data transfer speed necessary for presently transferred data, path loss information obtained from an RSSI or MCS, and a QoS of data.

Then, when the transmission power is determined, based on a relationship between the variation amount obtained in step S1501 and the minimum transmission power obtained in step S1502 (step S1503), the transmission power determination unit 114 outputs an instruction of power amplification to the RF transmission unit 113, so as to change to this transmission power (step S1504). Note that, the changed transmission power is used for all of the transmission packets including a beacon.

Next, the signal detection capability control unit 125 performs an adjustment so as to not detect a packet received with a low power, by changing the signal detection capability in the demodulation unit 122 within the reception unit 120 (step S1505) (same as above). However, it will be arbitrary whether or not an adjustment of the signal detection capability is also performed, along with a change of the transmission power.

Further, since discrepancies in the actual value are produced with the calculated path metric, and defects occur such as a packet loss of the transmission data, by the transmission power after being changed, a recalculation of the path metric is executed (step S1506). However, it will be arbitrary whether or not a recalculation of the path metric is also performed, along with a change of the transmission power.

Here, a supplemental remark will be described for a method which determines the transmission power based on a relationship between the variation amount (stability degree of path) and the minimum transmission power in step S1503.

For example, a look-up-table which obtains a transmission power from the variation amount and the minimum transmission power can be created in advance based on experiments, simulation calculations or the like, this can be stored in a Read Only Memory (ROM) or the like, and a transmission power can be obtained, by applying the values calculated in steps S1501 and S1502 to this look-up-table.

Figure 16:
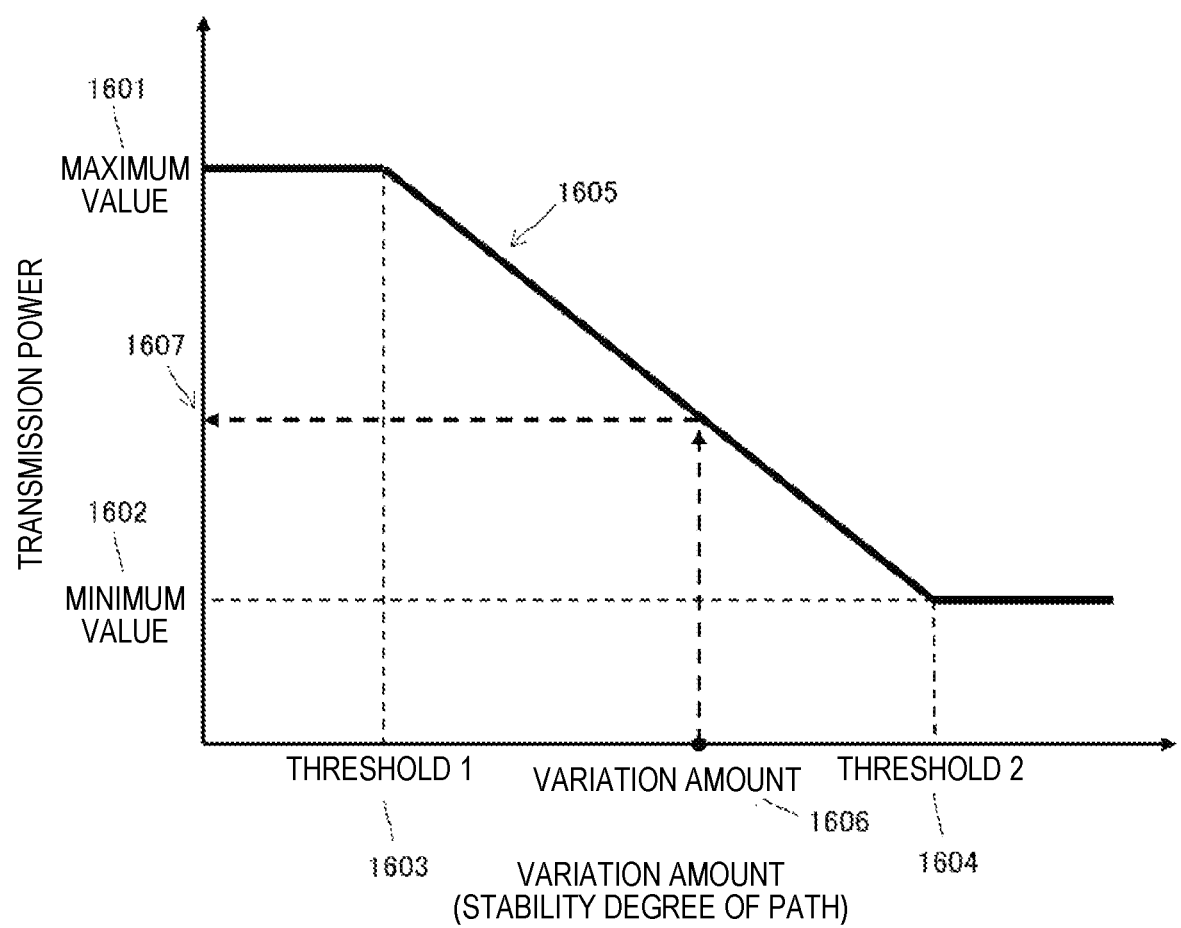
FIG. 16 is a figure which shows a graph representing a relationship between a transmission power and a variation amount (a stability degree of a path).

Alternatively, an appropriate transmission power can be obtained, by creating a graph representing a relationship between the transmission power and the variation amount (stability degree of path), and applying the variation amount (stability degree of path) obtained in step S1501 to this graph, such as shown in FIG. 16, based on the values calculated by steps S1501 and S1502. In the graph shown in FIG. 16, a maximum value 1601 of the transmission power is a value, for example, which is determined by an output limit of the RF transmission unit 113 within the transmission unit 110. Further, a minimum value 1602 of the transmission power is a transmission power which becomes a necessary minimum limit at which the present data transfer is able to be retained, and is calculated in step S1502. Further, a lower threshold 1 and an upper threshold 2 of the variation amount shown by reference numerals 1603 and 1604 are determined by a request or the like of an application which requests data transfer. In this way, when the variation amount 1506 obtained in step S1501 is applied to the obtained graph 1605, a transmission power 1607 is determined.

Note that, in the case where new traffic has been generated, such as a new application starting up by the upper layer processing unit 130, the wireless communication apparatus 100 reconsiders the setting of the transmission power, at a regular timing. In this case, the transmission power may return up until a maximum value, and a minimal transmission power may be recalculated. Reconsideration of the setting of the transmission power, in accordance with the start of a new application and at a regular timing, corresponds not only to the third embodiment, but also to the first embodiment and the second embodiment.

By performing a control of the transmission power in accordance with the stability degree of a path such as shown in FIG. 14 and FIG. 15, the wireless communication apparatus 100 can improve a transmission opportunity of other terminal stations, in the case where a terminal station which becomes a communication partner is fixed, and data to be transmitted and received does not vary.

(2) Transmission Power Control for Limiting the Addition of New Links

There is a difficult condition in which a terminal station which is busy with data transmission and reception of itself and has no room to accept new traffic, or a terminal station which has no room for power in order to operate by batteries, provides a release for other terminal stations. However, in a wireless mesh network, a path metric is calculated and a relay node is set based on this result. In other words, since a condition such as that described above within a relay node is not considered in the selection of a path, the possibility of providing an undesirable link is produced, such as including a terminal station in a relay node which has no room for a resource.

Accordingly, the influence degree estimation unit 124 comprehends the condition of a terminal station itself as an influence degree given to itself by data transmission and reception of itself, and the transmission power control unit 114 performs a control of the transmission power in accordance with the condition of the terminal station itself.

For example, in the case where there is a condition in which it may be necessary for a terminal station to avoid the occurrence of new links, data transfer is performed by a minimal transmission power at which the present traffic is able to be provided. When the terminal station changes the transmission power, a recalculation of a path metric is executed. As a result of this, there will be a low possibility of a terminal station set to a minimal transmission power being used as a relay node of another link. Further, at the time when a limit of new links becomes unnecessary, such having the present traffic of itself ended, or connecting to an AC power supply, a terminal station has new links accepted (as a relay node), by returning the transmission power to the original state.

Figure 17:
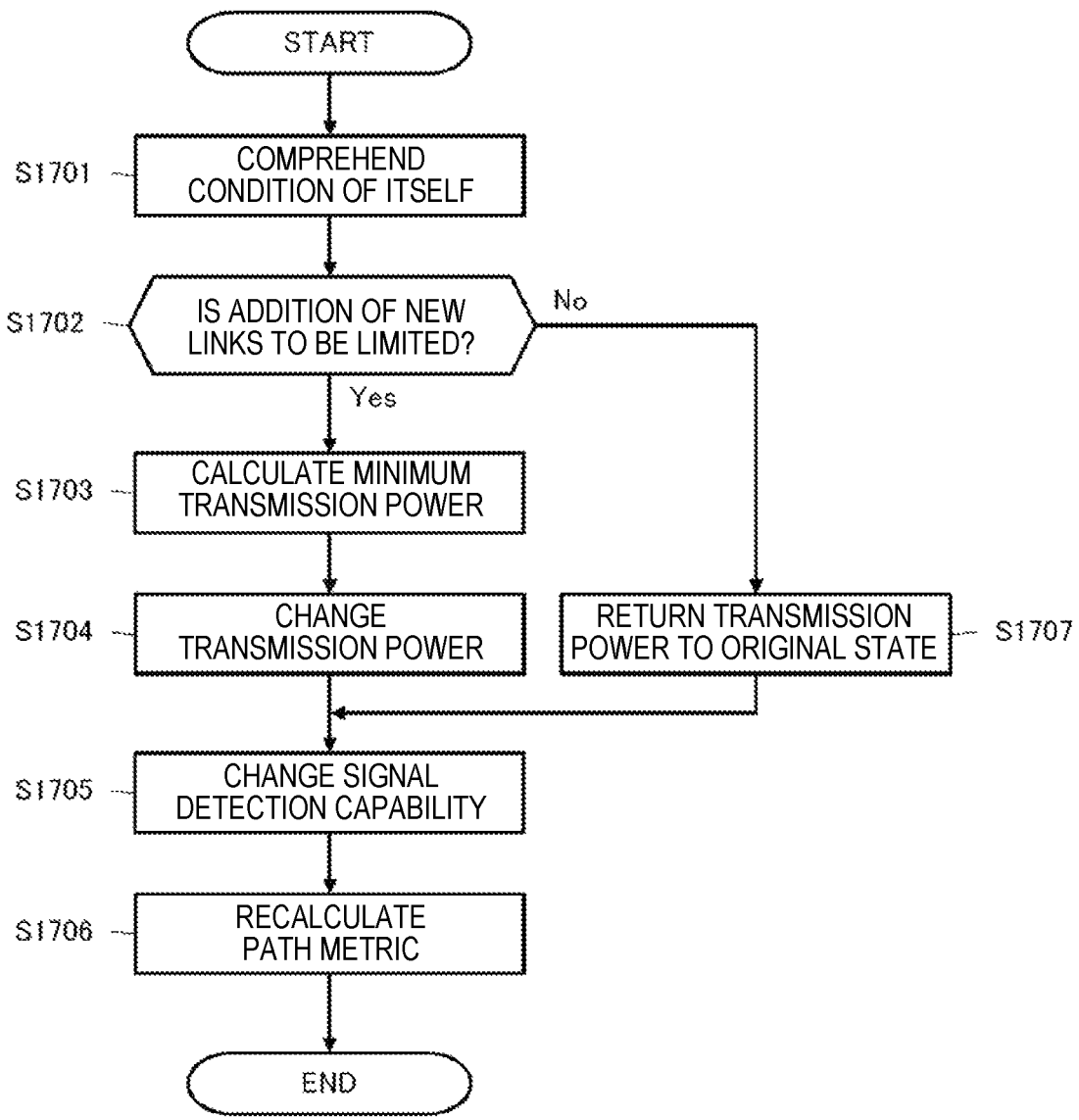
FIG. 17 is a flow chart which shows a process procedure for the wireless communication apparatus 100 to control a transmission power in accordance with the condition of itself.

FIG. 17 shows a process procedure, in the form of a flow chart, for the wireless communication apparatus 100 to control the transmission power in accordance with the condition of itself.

First, the influence degree estimation unit 124 comprehends the condition of the wireless communication apparatus 100 itself (step S1701). In order to comprehend the condition of the wireless communication apparatus 100 itself, the influence degree estimation unit 124 may cooperate, for example, with the upper layer processing unit 130, or a function module other than this (not illustrated in FIG. 1).

Then, the influence degree estimation unit 124 checks whether or not the addition of new links is to be limited, based on the comprehended condition (step S1702). For example, in the case where it is busy with data transmission and reception of itself and there is no room to accept new traffic, or there is no room for power in order to operate by batteries, it is decided that the addition of new links is to be limited (Yes in step S1702). In this case, an instruction is output from the influence degree estimation unit 124 to the transmission power control unit 114, so as to perform a change of the transmission power which performs data transmission from the transmission unit 110.

In order for a change of the transmission power, first, a minimum transmission power is calculated (step S1703). A minimum transmission power is a transmission power which becomes a necessary minimum limit at which the present data transfer is able to be retained. A minimum transmission power is calculated, for example, in the influence degree estimation unit 123 or the upper layer processing unit 130, based on a data transfer speed necessary for presently transferred data, path loss information obtained from an RSSI or MCS, and a QoS of data.

Then, the transmission power control unit 114 outputs an instruction of power amplification to the RF transmission unit 113, so as to change to the minimum transmission power (step S1704). Note that, the calculated transmission power is used for all of the transmission packets including a beacon.

A terminal station can limit the addition of new links, by causing the transmission power to be reduced, and can be devoted to data transmission and reception of itself, or can secure a battery operation time.

On the other hand, at the time where it may not be necessary to limit the addition of new links, by having a limit of new links become unnecessary or the like, such as having the present traffic of itself ended, or connecting to an AC power supply (No in step S1702), the influence degree estimation unit 124 performs an instruction to the transmission power control unit 114 so as to return, to the original state, the transmission power reduced to the minimum transmission power (step S1707). In this way, this wireless communication apparatus 100 has new links accepted which become a relay node. Further, a margin of the transmission power for surely performing data transmission can be secured.

At the time when the transmission power is changed in step S1704 or step S1707, in combination with this, the signal detection capability control unit 125 performs an adjustment so as to not detect a packet received with a low power, by changing the signal detection capability in the demodulation unit 122 within the reception unit 120 (step S1705) (same as above). However, it will be arbitrary whether or not an adjustment of the signal detection capability is also performed, along with a change of the transmission power.

Further, at the time when the transmission power is changed in step S1704 or step S1707, there will be the possibility that discrepancies in the actual value are produced with the calculated path metric, and defects occur such as a packet loss of the transmission data. Accordingly, a recalculation of the path metric is executed (step S1706). For example, a recalculation of the path metric is executed, by having the wireless communication apparatus 100 transmit a path request (PREQ) at the time when operating as a transmission source of multi-hop transmission, or transmit a path error (PERR) at the time when operating as a relay station. By changing the transmission power, and afterwards performing a recalculation of the metric by the transmission of a PREQ or PERR, it becomes possible for a terminal station to select a path corresponding to the transmission power at an early stage (same as above). However, it will be arbitrary whether or not a recalculation of the path metric is also performed, along with a change of the transmission power.

(3) Transmission Power Control in the Case where there is Room for a Link Condition of a Peer Up until here, embodiments have been described in which a control of the transmission power is performed, by taking into consideration an influence degree which a terminal station gives to other terminal stations by data transmission and reception of itself, and a request according the condition of itself.

However, in the case where there is no influence degree to other terminal stations or no request of itself, by positively controlling the transmission power, it will be useful for an improvement of a transmission opportunity of other terminal stations. Such a positive transmission power control can be performed in the case where a terminal station has room for a link condition of a peer.

Figure 18:
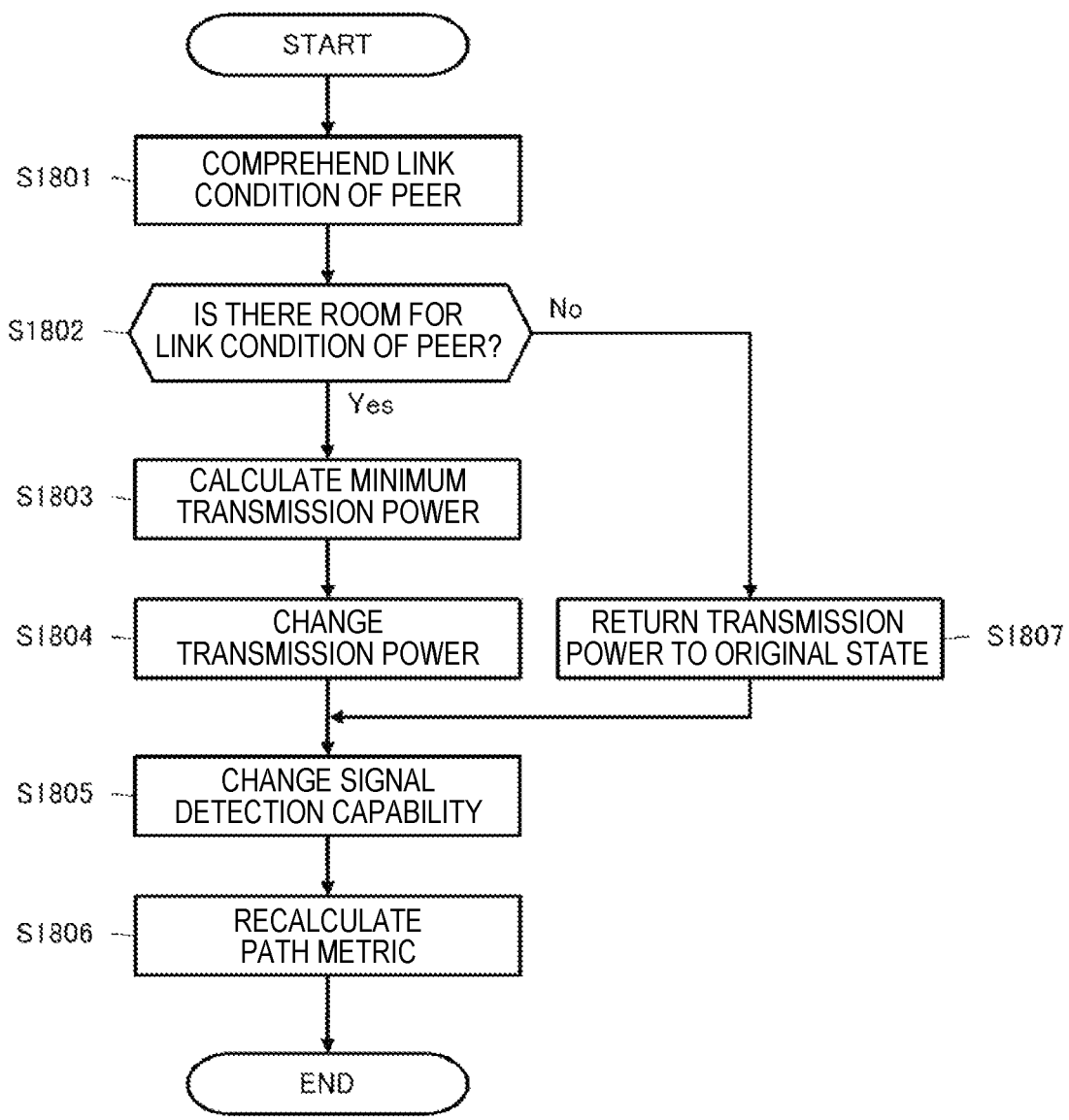
FIG. 18 is a flow chart which shows a process procedure for the wireless communication apparatus 100 to positively control a transmission power.

FIG. 18 shows a process procedure, in the form of a flow chart, for the wireless communication apparatus 100 to positively control the transmission power.

First, the influence degree estimation unit 124 estimates a link condition of a peer of the wireless communication apparatus 100 itself (step S1801). The influence degree estimation unit 124 estimates a link condition of a peer with this terminal station, for example, based on an MCS used for transmission to a certain terminal station, a reception RSSI from this terminal station, and a report value of an RSSI from this terminal station. In order to comprehend a link condition of a peer, the influence degree estimation unit 124 may cooperate, for example, with the upper layer processing unit 130, or a function module other than this (not illustrated in FIG. 1).

Then, the influence degree estimation unit 124 checks whether or not the addition of new links is to be limited, based on the comprehended condition (step S1802). For example, in the case where an MCS (or a Phy rate) used for transmission to this terminal station is sufficiently high, and there is still room for a reception RSSI from this terminal station and a report value of an RSSI from this terminal station, it is decided that there is room for a link condition of this peer (Yes in step S1802). In this case, an instruction is output from the influence degree estimation unit 124 to the transmission power control unit 114, so as to perform a change of the transmission power which performs data transmission from the transmission unit 110.

In order for a change of the transmission power, first, a minimum transmission power to transmit a packet to this terminal station is calculated (step S1803). A minimum transmission power is a transmission power which becomes a necessary minimum limit at which the present data transfer is able to be retained. A minimum transmission power is calculated, for example, in the influence degree estimation unit 123 or the upper layer processing unit 130, based on a data transfer speed necessary for presently transferred data, path loss information obtained from an RSSI or MCS, and a QoS of data.

Then, the transmission power control unit 114 outputs an instruction of power amplification to the RF transmission unit 113, so as to change the transmission power of a transmission packet to this terminal station to the minimum transmission power (step S1804). By causing the transmission power used for a link of a peer to be reduced, it will be useful for an improvement of a transmission opportunity of other terminal stations. On the other hand, in the case where there is no room for a link condition of a peer (No in step S1802), the influence degree estimation unit 124 performs an instruction to the transmission power control unit 114 so as to return, to the original state, the transmission power reduced to the minimum transmission power (step S1807). In this way, a link of a peer is maintained.

At the time when the transmission power is changed in step S1804 or step S1807, in combination with this, the signal detection capability control unit 125 performs an adjustment so as to not detect a packet received with a low power, by changing the signal detection capability in the demodulation unit 122 within the reception unit 120 (step S1805) (same as above). However, it will be arbitrary whether or not an adjustment of the signal detection capability is also performed, along with a change of the transmission power.

Further, at the time when the transmission power is changed in step S1804 or step S1807, there will be the possibility that discrepancies in the actual value are produced with the calculated path metric, and defects occur such as a packet loss of the transmission data. Accordingly, a recalculation of the path metric is executed (step S1806). For example, a recalculation of the path metric is executed, by having the wireless communication apparatus 100 transmit a path request (PREQ) at the time when operating as a transmission source of multi-hop transmission, or transmit a path error (PERR) at the time when operating as a relay station. By changing the transmission power, and afterwards performing a recalculation of the metric by the transmission of a PREQ or PERR, it becomes possible for a terminal station to select a path corresponding to the transmission power at an early stage (same as above). However, it will be arbitrary whether or not a recalculation of the path metric is also performed, along with a change of the transmission power.

According to the third embodiment, by controlling the transmission power based on the condition of itself, such as the form of the power supply, the transmission and reception partner, or the time, it becomes possible for the wireless communication apparatus 100 to perform a setting of a smooth path in a mesh network, such as changing the path metric or avoiding an unnecessary relay.

Further, according to the third embodiment, by using a minimal transmission power corresponding to the service of data to be transferred or a QoS, a terminal station can suppress interference to other terminal stations, and can prevent a reduction of a transmission opportunity of other terminal stations.

Further, according to the third embodiment, by performing a change of a signal detection capability together with a change in a transmission power of itself, a terminal station can reduce the non-uniformity of a transmission opportunity between terminal stations.

Further, according to the third embodiment, by changing a transmission power or a signal detection capability of itself, and afterwards performing a recalculation of a path metric by the transmission of a PREQ or PERR, it becomes possible for a terminal station to perform a selection of a path corresponding to the transmission power at an early stage.

Embodiment 4

In order for a terminal station to determine a transmission parameter such as an MCS, information of a path loss may be necessary. In the case where there is no transmission power control, that is, in the case where the transmission power of all terminal stations is fixed, a reception RSSI can be measured from a certain terminal station, and a path loss can be estimated by taking a difference with the transmission powers. However, in the above described first through to third embodiments, since a terminal station performs a control of the transmission power, the transmission power of other terminal stations is unclear, and a path loss is not able to be estimated. Accordingly, the above described problem (4) is brought about.

Accordingly, hereinafter, a method will be described in which a number of transmission powers of other terminals are acquired.

(1) Method in which Transmission Power Information is Added to an Existing Frame and Transmitted A beacon frame can be included as an existing frame to which transmission power information is added. In a wireless LAN standard such as IEEE802.11, in order to transfer whether or not communication is possible, a communication station prescribes that a beacon frame is to be broadcast in a fixed time interval. Various information elements (Information Element: IE) can be stored in a frame body of a beacon frame. A Vendor Specific IE is defined as one of these. A Vendor Specific IE is an information element capable of being freely added and used by a vendor. In the present embodiment, by storing information of the transmission power in this information element within a beacon frame, and mutually using it, each of the terminal stations can mutually acquire the transmission power.

Further, a notification frame of the transmission power can be included as an existing frame to which transmission power information is added. In IEEE802.11, a mechanism which notifies the transmission power is prepared, with the aim of suppressing interference to other systems mainly using 5 GHz. According to this mechanism, a frame Transmit Power Control (TPC) Request, in which one of the terminal stations requests a notification of the transmission power to another terminal station, and a frame TPV Report, in which the other terminal station receiving this request notifies the transmission power, are defined. This mechanism can be used by any band. In the present embodiment, a notification of the transmission power can be performed by using these frames. It is needless to say that transmission power information may be broadcast, multicast, or unicast, as a data packet of an IP layer, without using an existing frame.

As described above, according to a method in which transmission power information is added to an existing frame and transmitted, by adding transmission power information to a Vendor Specific IE of a beacon frame or an Action frame related to transmission power control, a terminal station can notify information of the present transmission power to a communication partner. Therefore, by estimating a path loss based on received information of the transmission power and a reception RSSI, at the terminal station side of a communication partner, a more accurate MCS can be determined.

(2) Method in which the Transmission Power is Estimated, without a Notification of the Transmission Power It is possible for terminal stations periodically performing data transfer to estimate the transmission power, even if not notifying information of the transmission power. This uses an MCS used by a terminal station of a communication partner. A transmission MCS is generally calculated and determined based on a path loss and a packet error rate. Therefore, by measuring an MCS used for a data packet transmitted from a terminal station of a communication partner, and a packet error rate of a packet transmitted from this terminal station, a path loss can be back calculated. Also, since a reception RSSI can be measured, the terminal station can estimate the transmission power of a communication partner, based on the back calculated path loss and the RSSI.

Figure 19:
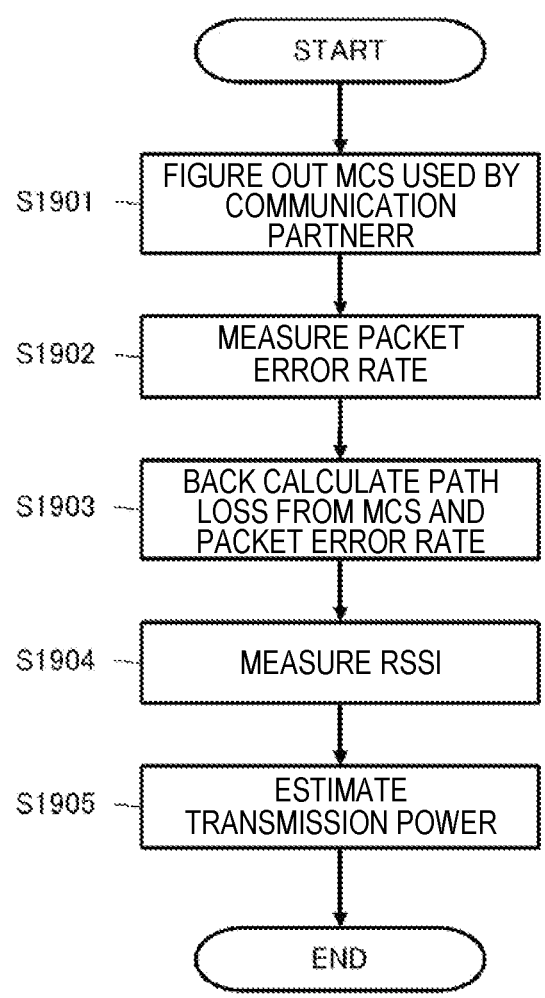
FIG. 19 is a flow chart which shows a process procedure for estimating a transmission power without a notification of the transmission power.

FIG. 19 shows a process procedure, in the form of a flow chart, for estimating the transmission power without a notification of the transmission power. While the following process can be performed by the upper layer processing unit 130, for example, it may also be performed by another function module.

First, an MCS used for a data packet transmitted from a terminal station of a communication partner is figured out, by decrypting the transmission data after being decoded by the channel decoding unit 123 (step S1901).

Further, a packet error rate of a packet transmitted from this terminal station is measured (step S1902).

Next, a path loss is back calculated, from the MCS of the communication partner and the measured packet error rate (step S1903).

Further, an RSSI of a reception packet is measured, in parallel with the above description (step S1904).

Then, the transmission power of the communication partner is estimated, based on the path loss back calculated in step S1903, and the RSSI measured in step S1904 (step S1905).

In this way, each of the terminal stations can estimate the transmission power without a notification from a communication partner, and can determine a more accurate MCS, based on an MCS and a reception RSSI used by the communication partner.

CITATION LIST

PATENT LITERATURE 1:
JP 2005-253047A
PATENT LITERATURE 2:
JP 2005-33557A

INDUSTRIAL APPLICABILITY

So far, the embodiment of the present disclosure has been described in detail with reference to a specific embodiment. However, it should be noted that various variations and alternative embodiments will become apparent to those skilled in the art without departing from the scope of the present disclosure.

While a description has been made in the present disclosure which centers on embodiments applied to a wireless network in which each terminal station performs autonomous distribution, such as an Ad-hoc network or a mesh network, the technology disclosed in the present disclosure is not limited to this. The technology disclosed in the present disclosure can be applied to various types of wireless networks, in which access to a media is controlled in accordance with an occupancy state of the media starting CSMA by each terminal station, and can suppress useless interference between terminal stations, and improve a transmission opportunity of each terminal station.

In short, the present technology has been disclosed in a form of illustration and should not be interpreted limitedly. To determine the gist of the present disclosure, patent claims should be taken into account.

Additionally, the present technology may also be configured as below.

(1)
A wireless communication apparatus including:
a transmission unit which transmits a wireless signal;
a reception unit which receives a wireless signal;
an influence degree estimation unit which estimates an influence degree given to a surrounding terminal station by transmission data from the transmission unit; and
a transmission power control unit which controls a transmission power of the transmission unit based on the influence degree.

(2)
The wireless communication apparatus according to (1), wherein the transmission power control unit controls a transmission power of the transmission unit based on the influence degree and a minimum transmission power capable of retaining a present data transfer.

(3)
The wireless communication apparatus according to (2), wherein a minimum transmission power capable of retaining a present data transfer is calculated based on a data transfer speed necessary for presently transferred data, path loss information obtained from an RSSI or MCS, and a QoS of data.

(4)
The wireless communication apparatus according to (2), wherein, at a time when the influence degree exceeds a prescribed value, the transmission power control unit changes a transmission power of the transmission unit to the minimum transmission power.

(5)
The wireless communication apparatus according to (2), wherein the transmission power control unit changes a transmission power to a transmission power corresponding to a relationship between the influence degree and the minimum transmission power.

(6)

The wireless communication apparatus according to (1), wherein a signal detection capability in the reception unit is controlled in accordance with a change in a transmission power of the transmission unit.

(7)

The wireless communication apparatus according to (1), wherein the wireless communication apparatus performs a communication operation by a mesh network, and wherein a metric of a path is recalculated in accordance with a change in a transmission power of the transmission unit.

(8)

The wireless communication apparatus according to (1), wherein the influence degree estimation unit measures a traffic amount to be handled by the transmission unit and the reception unit as the influence degree.

(9)

The wireless communication apparatus according to (8), wherein the influence degree estimation unit measures a traffic amount by counting the number of packets or a size of packet to be transmitted and received by the transmission unit and the reception unit.

(10)

The wireless communication apparatus according to (1), wherein the influence degree estimation unit measures the number of links as the influence degree.

(11)

The wireless communication apparatus according to (1), wherein the influence degree estimation unit additionally estimates an influence degree given to the wireless communication apparatus itself by transmission data from the transmission unit, and wherein the transmission power control unit controls a transmission power of the transmission unit based on the influence degree.

(12)

The wireless communication apparatus according to (11), wherein the influence degree estimation unit estimates a stability degree of a path of the wireless communication apparatus, and wherein the transmission power control unit controls a transmission power of the transmission unit based on the stability degree of the path.

(13)

The wireless communication apparatus according to (12), wherein the influence degree estimation unit estimates the stability degree of the path based on a variation amount of a path metric, the number of links, and a traffic amount, in at least one fixed time in the past.

(14)

The wireless communication apparatus according to (11), wherein the influence degree estimation unit estimates whether or not there is a condition where an addition of a new link is to be limited by the wireless communication apparatus, and wherein the transmission power control unit controls a transmission power in accordance with the condition.

(15)

The wireless communication apparatus according to (14), wherein the influence degree estimation unit estimates whether or not there is a condition where an addition of a new link is to be limited based on at least one of a present traffic and power supply state.

(16)

The wireless communication apparatus according to (11), wherein the influence degree estimation unit estimates a link condition of a peer with a certain terminal station, and wherein the transmission power control unit controls a transmission power in accordance with the link condition.

(17)

The wireless communication apparatus according to (16), wherein the influence degree estimation unit estimates the link condition based on at least one of an MCS used for transmission to the terminal station, a reception RSSI from the terminal station, and a report value of an RSSI from the terminal station.

(18)

The wireless communication apparatus according to (1), wherein another terminal station is notified of information of a transmission power changed by the transmission power control unit.

(18-1)

The wireless communication apparatus according to (18), wherein information of the transmission power is stored in a Vendor Specific IE within a beacon frame and notified.

(18-2)

The wireless communication apparatus according to (18), wherein information of the transmission power is notified to another terminal station as a TPC Report which responds to a notification request TPC Request of a transmission power from the another terminal station.

(19)

The wireless communication apparatus according to (1), wherein a path loss is back calculated from an MCS used for a data packet transmitted from a terminal station of a communication partner, and a packet error rate of a packet transmitted from the terminal station, and a transmission power of the communication partner is estimated based on the path loss and a reception RSSI.

(20)

A wireless communication method including:

an influence degree estimation step which estimates an influence degree given to a surrounding terminal station by transmission data; and a transmission power control step which controls a transmission power at a time of data transmission based on the influence degree.

REFERENCE SIGNS LIST 100 wireless communication apparatus
101 antenna
110 transmission unit
111 channel encoding unit
112 modulation unit
113 RF transmission unit
114 transmission power control unit
120 reception unit
121 RF reception unit
122 demodulation unit
123 channel decoding unit
124 influence degree estimation unit
125 signal detection capability control unit
130 upper layer processing unit

The invention claimed is:

1. A wireless communication apparatus, comprising:
circuitry configured to:
transmit a first wireless signal;
receive a second wireless signal;
extract characteristic information from reception data of the second wireless signal;

control a transmission power of the first wireless signal based on an influence degree,
  wherein the influence degree relates to the wireless communication apparatus and at least one another wireless communication apparatus that is within a transmittable range of the wireless communication apparatus;
control a signal detection threshold of the wireless communication apparatus based on the transmission power of the first wireless signal;
  wherein the signal detection threshold is raised when the transmission power of the first wireless signal is reduced; and
detect the second wireless signal based on the signal detection threshold of the wireless communication apparatus.

2. The wireless communication apparatus according to claim 1, wherein the circuitry is further configured to estimate the influence degree based on the extracted characteristic information from the reception data of the second wireless signal.

3. The wireless communication apparatus according to claim 1, wherein the circuitry is further configured to extract characteristic information from transmission data of the first wireless signal.

4. The wireless communication apparatus according to claim 1, wherein the circuitry is further configured to estimate the influence degree at a first transmission power of the first wireless signal, based on the extracted characteristic information.

5. The wireless communication apparatus according to claim 1, wherein the circuitry is further configured to:
  control the signal detection threshold based on a change in the transmission power of the first wireless signal; and
  calculate a metric of a path between the wireless communication apparatus and the at least one another wireless communication apparatus based on the change in the transmission power of the first wireless signal.

6. The wireless communication apparatus according to claim 1, wherein the characteristic information includes at least one of a number of links associated with the wireless communication apparatus, a metric of a path between the wireless communication apparatus and the at least one another wireless communication apparatus, or a stability of the path between the wireless communication apparatus and the at least one another wireless communication apparatus.

7. The wireless communication apparatus according to claim 1, wherein the influence degree is associated with each of the characteristic information of the reception data of the second wireless signal and characteristic information of transmission data of the first wireless signal.

8. The wireless communication apparatus according to claim 1, wherein the circuitry is further configured to notify the at least one another wireless communication apparatus of a change in the transmission power of the first wireless signal.

9. The wireless communication apparatus according to claim 8, wherein the change in the transmission power is based on the influence degree that exceeds a threshold value of the transmission power of the first wireless signal.

10. A wireless communication method, comprising:
  in a wireless communication apparatus:
    transmitting a first wireless signal;
    receiving a second wireless signal;
    extracting characteristic information from reception data of the second wireless signal;
    controlling a transmission power of the first wireless signal based on an influence degree,
      wherein the influence degree relates to the wireless communication apparatus and at least one another wireless communication apparatus that is within a transmittable range of the wireless communication apparatus;
    controlling a signal detection threshold of the wireless communication apparatus based on the transmission power of the first wireless signal;
      wherein the signal detection threshold is raised when the transmission power of the first wireless signal is reduced; and
    detecting the second wireless signal based on the signal detection threshold of the wireless communication apparatus.

11. The wireless communication method according to claim 10, further comprising estimating the influence degree based on the extracted characteristic information from the reception data of the second wireless signal.

12. The wireless communication method according to claim 10, further comprising extracting characteristic information from transmission data of the first wireless signal.

13. The wireless communication method according to claim 10, further comprising estimating the influence degree at a first transmission power of the first wireless signal, based on the extracted characteristic information.

14. The wireless communication method according to claim 10, further comprising:
  controlling the signal detection threshold based on a change in the transmission power of the first wireless signal; and
  calculating a metric of a path between the wireless communication apparatus and the at least one another wireless communication apparatus based on the change in the transmission power of the first wireless signal.

15. The wireless communication method according to claim 10, wherein the characteristic information includes at least one of a number of links associated with the wireless communication apparatus, a metric of a path between the wireless communication apparatus and the at least one another wireless communication apparatus, or a stability of the path between the wireless communication apparatus and the at least one another wireless communication apparatus.

16. The wireless communication method according to claim 10, wherein the influence degree is associated with each of the characteristic information of the reception data and characteristic information of transmission data.

17. The wireless communication method according to claim 10, further comprising notifying the at least one another wireless communication apparatus of a change in the transmission power of the first wireless signal.

18. The wireless communication method according to claim 17, wherein the change in the transmission power of the first wireless signal is based on the influence degree that exceeds a threshold value of the transmission power.

19. A non-transitory computer-readable medium having stored thereon, computer-executable instructions which, when executed by a processor, cause the processor to execute operations, the operations comprising:
  transmitting a first wireless signal;
  receiving a second wireless signal;
  extracting characteristic information from reception data of the second wireless signal;
  controlling a transmission power of the first wireless signal based on an influence degree, wherein the influence degree relates to a wireless communication apparatus and at least one another wireless communication apparatus that is within a transmittable range of the wireless communication apparatus;
controlling a signal detection threshold of the wireless communication apparatus based on the transmission power of the first wireless signal,
wherein the signal detection threshold is raised when the transmission power of the first wireless signal is reduced; and
detecting the second wireless signal based on the signal detection threshold of the wireless communication apparatus.

\* \* \* \* \*